(12) United States Patent
Deixler et al.

(10) Patent No.: US 12,553,835 B2
(45) Date of Patent: Feb. 17, 2026

(54) HORTICULTURE SYSTEM AND METHOD

(71) Applicant: SIGNIFY HOLDING B.V., Eindhoven (NL)

(72) Inventors: Peter Deixler, Arlington, MA (US); Hugo Jose Krajnc, Eindhoven (NL); Hendrik Stevens, Waalre (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 305 days.

(21) Appl. No.: 17/921,461

(22) PCT Filed: Apr. 20, 2021

(86) PCT No.: PCT/EP2021/060179
§ 371 (c)(1),
(2) Date: Oct. 26, 2022

(87) PCT Pub. No.: WO2021/219427
PCT Pub. Date: Nov. 4, 2021

(65) Prior Publication Data
US 2023/0168212 A1    Jun. 1, 2023

Related U.S. Application Data

(60) Provisional application No. 63/015,736, filed on Apr. 27, 2020, provisional application No. 63/015,733,
(Continued)

(30) Foreign Application Priority Data

May 11, 2020  (EP) ..................... 20173863
May 11, 2020  (EP) ..................... 20173871
(Continued)

(51) Int. Cl.
*G01N 22/04*      (2006.01)
*A01G 9/24*       (2006.01)

(52) U.S. Cl.
CPC ............. *G01N 22/04* (2013.01); *A01G 9/241* (2013.01); *A01G 9/246* (2013.01); *A01G 9/247* (2013.01); *A01G 9/249* (2019.05)

(58) Field of Classification Search
CPC ........ G01N 22/04; A01G 9/249; A01G 9/241; A01G 9/246; A01G 9/247
(Continued)

(56) References Cited

U.S. PATENT DOCUMENTS 1,981,884 A * 11/1934 Taylor ................... G01S 13/003
                                                                 367/128
2,273,914 A *  2/1942 Wallace .................... G01S 1/02
                                                                 361/298.1
(Continued)

FOREIGN PATENT DOCUMENTS

EP    2662699 A1 * 11/2013 ............... G01S 3/74
EP    3674703 A1 *  7/2020 ......... G01N 33/0098
(Continued)

OTHER PUBLICATIONS

Henry Dominique et al., "Remote Estimation of Intra-Parcel Grape Quantity From Three-Dimensional Imagery Technique Using Ground-Based Microwave FMCW Radar," IEEE Instrumentation & Measurement Magazine, Jun. 2017 (5 Pages).
(Continued)

*Primary Examiner* — Nuzhat Pervin

(57) ABSTRACT

The invention provides a method for sensing a plant-related parameter in a horticulture space (115), wherein (i) a radio transmitter (151) and a radio receiver (152) are arranged such that a radio path (153) between the radio transmitter (151) and the radio receiver (152) passes through at least part of the horticulture space (115), and (ii) the radio receiver (152) is configured in a radio signal receiving relationship with the radio transmitter (151), wherein the method comprises a sensing stage comprising: emitting a
(Continued)

radio signal with the radio transmitter (151); detecting the radio signal with the radio receiver (152) and providing a related receiver signal; and determining the plant-related parameter based on the receiver signal.

10 Claims, 19 Drawing Sheets

Related U.S. Application Data filed on Apr. 27, 2020, provisional application No. 63/015,739, filed on Apr. 27, 2020, provisional application No. 63/015,731, filed on Apr. 27, 2020.

(30) Foreign Application Priority Data

| | | |
|---|---|---|
| May 11, 2020 | (EP) | 20173878 |
| May 11, 2020 | (EP) | 20173883 |

(58) Field of Classification Search
USPC .......................................................... 342/22
See application file for complete search history.

(56) References Cited

U.S. PATENT DOCUMENTS

| | | | | |
|---|---|---|---|---|
| 2,462,764 | A * | 2/1949 | O'Brien | G01S 1/02 |
| | | | | 342/394 |
| 2,962,714 | A * | 11/1960 | Cafarelli, Jr. | G01S 1/02 |
| | | | | 367/125 |
| 2,980,793 | A * | 4/1961 | Daniel | G08G 1/096783 |
| | | | | 455/523 |
| 5,973,601 | A * | 10/1999 | Campana, Jr. | H04B 17/23 |
| | | | | 370/514 |
| 6,169,485 | B1 * | 1/2001 | Campana, Jr. | H04B 17/318 |
| | | | | 342/147 |
| 7,009,912 | B1 * | 3/2006 | Haley | G01S 3/8083 |
| | | | | 342/21 |
| 8,341,880 | B2 * | 1/2013 | Lejeune | A01C 1/00 |
| | | | | 47/66.7 |
| 9,562,968 | B2 * | 2/2017 | Wu | G01S 3/74 |
| 9,664,631 | B2 * | 5/2017 | Delie | G01N 33/025 |
| 9,869,762 | B1 * | 1/2018 | Alland | H01Q 21/08 |
| 10,021,766 | B2 * | 7/2018 | Vogel | H05B 47/11 |
| 10,048,366 | B1 * | 8/2018 | Hong | G01S 13/723 |
| 10,172,296 | B2 * | 1/2019 | Krijn | A01G 7/045 |
| 10,306,847 | B2 * | 6/2019 | Whitcher | A01G 9/246 |
| 10,359,512 | B1 * | 7/2019 | Hong | G01S 13/878 |
| 10,597,896 | B1 * | 3/2020 | Hamilton | E04H 15/10 |
| 10,761,206 | B2 * | 9/2020 | Chandra | A01B 79/02 |
| 11,064,659 | B2 * | 7/2021 | Loessl | A01G 9/00 |
| 11,083,143 | B2 * | 8/2021 | Pham | A01G 9/249 |
| 11,506,775 | B2 * | 11/2022 | Holt | H01Q 1/525 |
| 11,557,927 | B2 * | 1/2023 | Glover | H02J 50/80 |
| 11,596,118 | B2 * | 3/2023 | Rosen | H05B 45/10 |
| 11,635,506 | B2 * | 4/2023 | Iwasa | G01S 13/003 |
| | | | | 342/70 |
| 12,078,745 | B2 * | 9/2024 | Kishigami | G01S 13/288 |
| 12,130,215 | B2 * | 10/2024 | Scavo | G01N 1/36 |
| 2001/0000959 | A1 * | 5/2001 | Campana, Jr. | H04B 17/18 |
| | | | | 343/741 |
| 2002/0130809 | A1 * | 9/2002 | Kim | H01Q 25/00 |
| | | | | 340/3.1 |
| 2005/0184908 | A1 * | 8/2005 | Richards | G01S 11/06 |
| | | | | 342/465 |
| 2006/0007036 | A1 * | 1/2006 | Natsume | G01S 3/74 |
| | | | | 342/107 |
| 2006/0096174 | A1 * | 5/2006 | Haupt | A01G 25/167 |
| | | | | 47/79 |
| 2006/0157580 | A1 * | 7/2006 | Regli | A01G 25/167 |
| | | | | 239/69 |
| 2012/0198762 | A1 * | 8/2012 | Lee | A01G 7/045 |
| | | | | 47/1.01 R |
| 2015/0149090 | A1 * | 5/2015 | Marquez | G01D 21/02 |
| | | | | 702/2 |
| 2015/0342125 | A1 * | 12/2015 | Krijn | A01G 7/045 |
| | | | | 315/297 |
| 2016/0088802 | A1 * | 3/2016 | Nicole | A01G 22/05 |
| | | | | 315/297 |
| 2016/0192598 | A1 * | 7/2016 | Haggarty | H05B 47/16 |
| | | | | 315/297 |
| 2017/0219711 | A1 | 8/2017 | Redden et al. | |
| 2017/0295582 | A1 * | 10/2017 | Gurney | H04W 72/542 |
| 2018/0024235 | A1 * | 1/2018 | Hong | G01S 13/87 |
| | | | | 342/59 |
| 2018/0028700 | A1 * | 2/2018 | Dobrinsky | A01G 7/06 |
| 2018/0035617 | A1 * | 2/2018 | Stanley | F21V 29/60 |
| 2019/0029200 | A1 * | 1/2019 | Mawendra | A01G 9/243 |
| 2019/0098723 | A1 * | 3/2019 | Sadwick | H05B 45/3725 |
| 2019/0098843 | A1 * | 4/2019 | Rosen | G02F 1/01 |
| 2019/0124865 | A1 * | 5/2019 | Sunnen | A01G 7/02 |
| 2019/0261589 | A1 * | 8/2019 | Pham | A01G 9/027 |
| 2019/0276623 | A1 * | 9/2019 | Szeifert | C08G 12/32 |
| 2019/0335675 | A1 * | 11/2019 | Ngo | F21V 23/007 |
| 2020/0110170 | A1 * | 4/2020 | Chandra | G01N 27/048 |
| 2020/0205360 | A1 * | 7/2020 | Tabakman | A01G 9/249 |
| 2020/0260653 | A1 * | 8/2020 | Douglas | A01G 7/02 |
| 2021/0025969 | A1 * | 1/2021 | Ouchi | G01S 13/931 |
| 2021/0055404 | A1 * | 2/2021 | Schoor | G01S 13/931 |
| 2021/0111479 | A1 * | 4/2021 | Spalink | G01S 13/89 |
| 2021/0112727 | A1 * | 4/2021 | Nicole | A01G 7/045 |
| 2021/0215319 | A1 * | 7/2021 | Raring | H01S 5/0225 |
| 2021/0270976 | A1 * | 9/2021 | Staats | G01S 5/02 |
| 2021/0337748 | A1 * | 11/2021 | Bouwens | A01G 25/167 |
| 2022/0042672 | A1 * | 2/2022 | Raring | H01S 5/4087 |
| 2023/0064629 | A1 * | 3/2023 | Van De Poel | G05B 19/406 |
| 2024/0304990 | A1 * | 9/2024 | Tran | H04W 4/40 |

FOREIGN PATENT DOCUMENTS

| | | | | |
|---|---|---|---|---|
| EP | 3282830 | B1 * | 12/2023 | B65G 1/0492 |
| WO | WO-2015006675 | A2 * | 1/2015 | G06V 10/751 |

OTHER PUBLICATIONS

R. Gente et al., "Contactless Water Status Measurements on Plants at 35 GHz," Journal of Infrared, Millimeter, and Terahertz Waves, Published Dec. 2014 (17 Pages).

Rafael V. Aroca et al., "Application of Standard EPC/GEN2 UHF RFID Tags as Soil Mosture Sensors," Procceedings, www.mdpi.com/journal/proceedings, 2017 (6 Pages).

Takaharu Kameoka et al., "Environmental Measurement for Indoor Plant Factory With Micro-Miniature Size Wireless Sensor," Sice Annual Conference 2011, Waseda University, Tokyo, Japan (6 Pages).

* cited by examiner

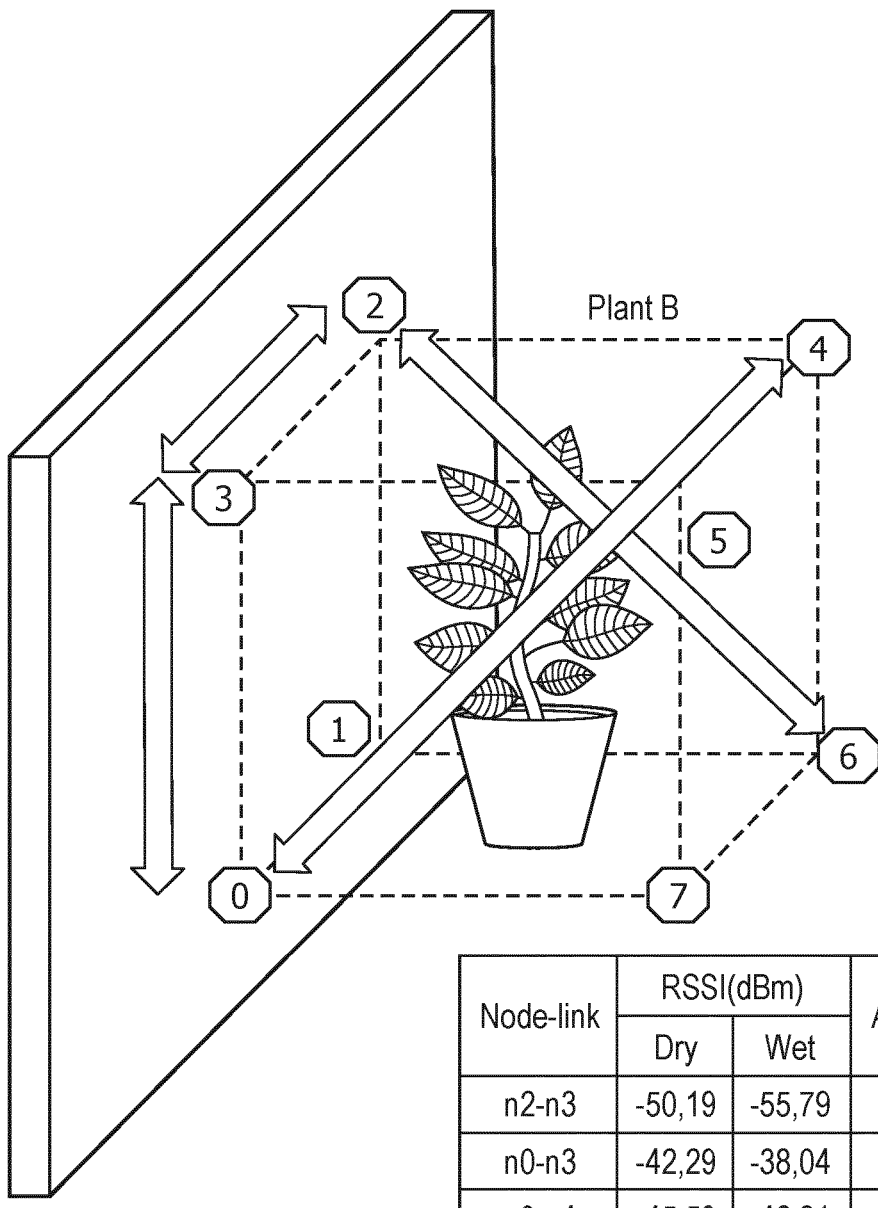
| Node-link | RSSI(dBm) Dry | RSSI(dBm) Wet | Abs-delta | % |
|---|---|---|---|---|
| n2-n3 | -50,19 | -55,79 | 5,6 | 11,16 |
| n0-n3 | -42,29 | -38,04 | 4,25 | 10,05 |
| n0-n4 | -45,59 | -42,81 | 2,78 | 6,10 |
| n2-n6 | -45,92 | -43,28 | 2,64 | 5,75 |
Continuation of FIG. 4

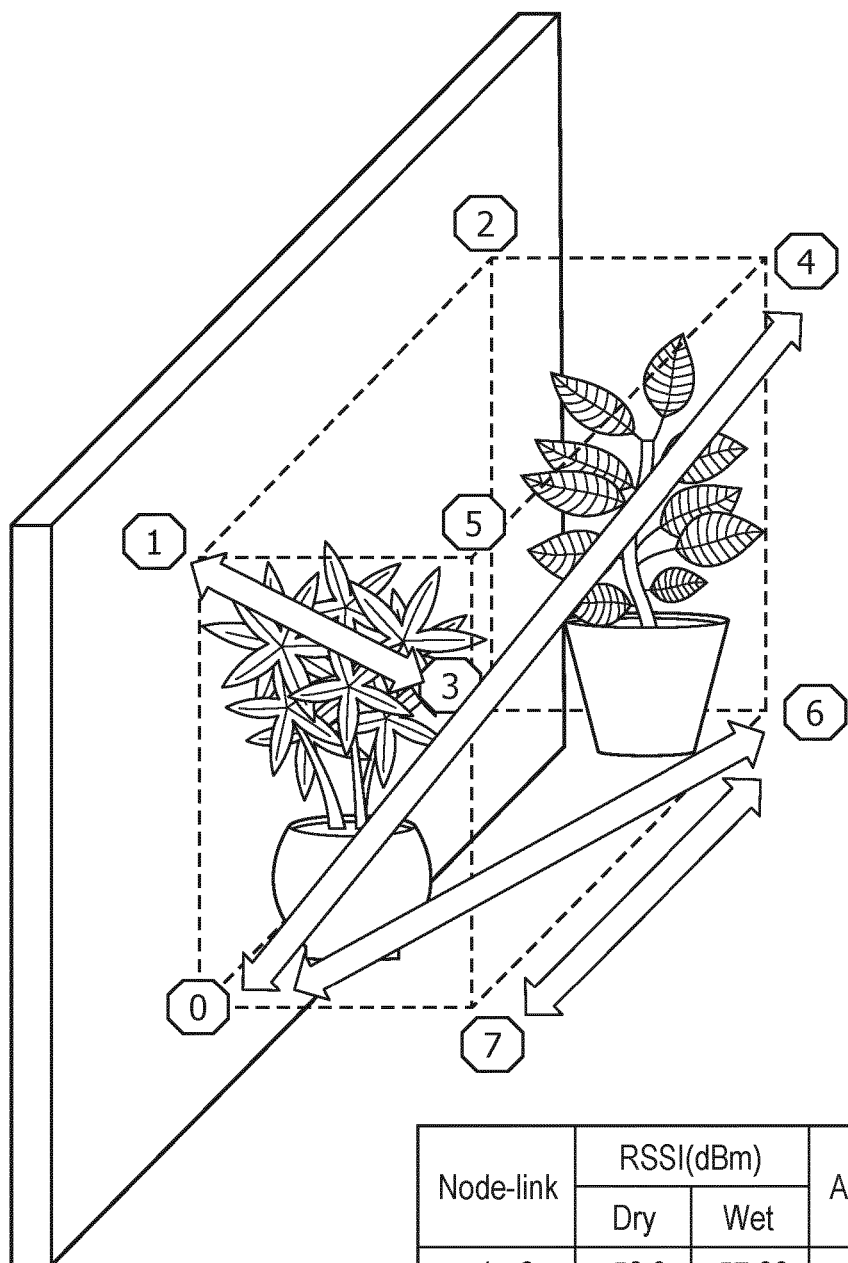
| Node-link | RSSI(dBm) Dry | RSSI(dBm) Wet | Abs-delta | % |
|---|---|---|---|---|
| n1-n3 | -52,6 | -57,66 | 5,1 | 9,70 |
| n0-n6 | -53,1 | -49,92 | 3,18 | 5,99 |
| n0-n4 | -65,1 | -61,58 | 3,55 | 5,45 |
| n6-n7 | -52,2 | -49,53 | 2,68 | 5,13 |
Continuation of FIG. 4

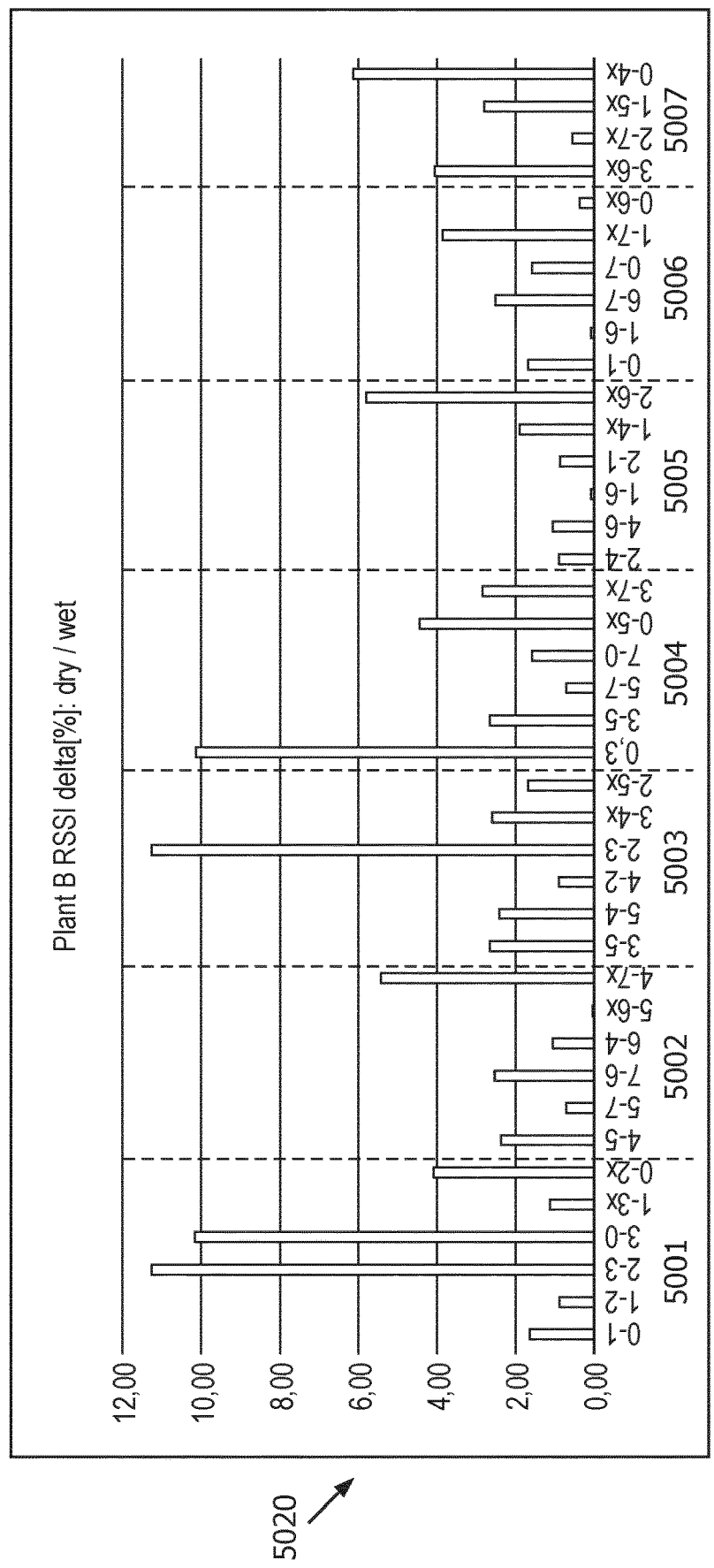
Continuation of FIG. 6

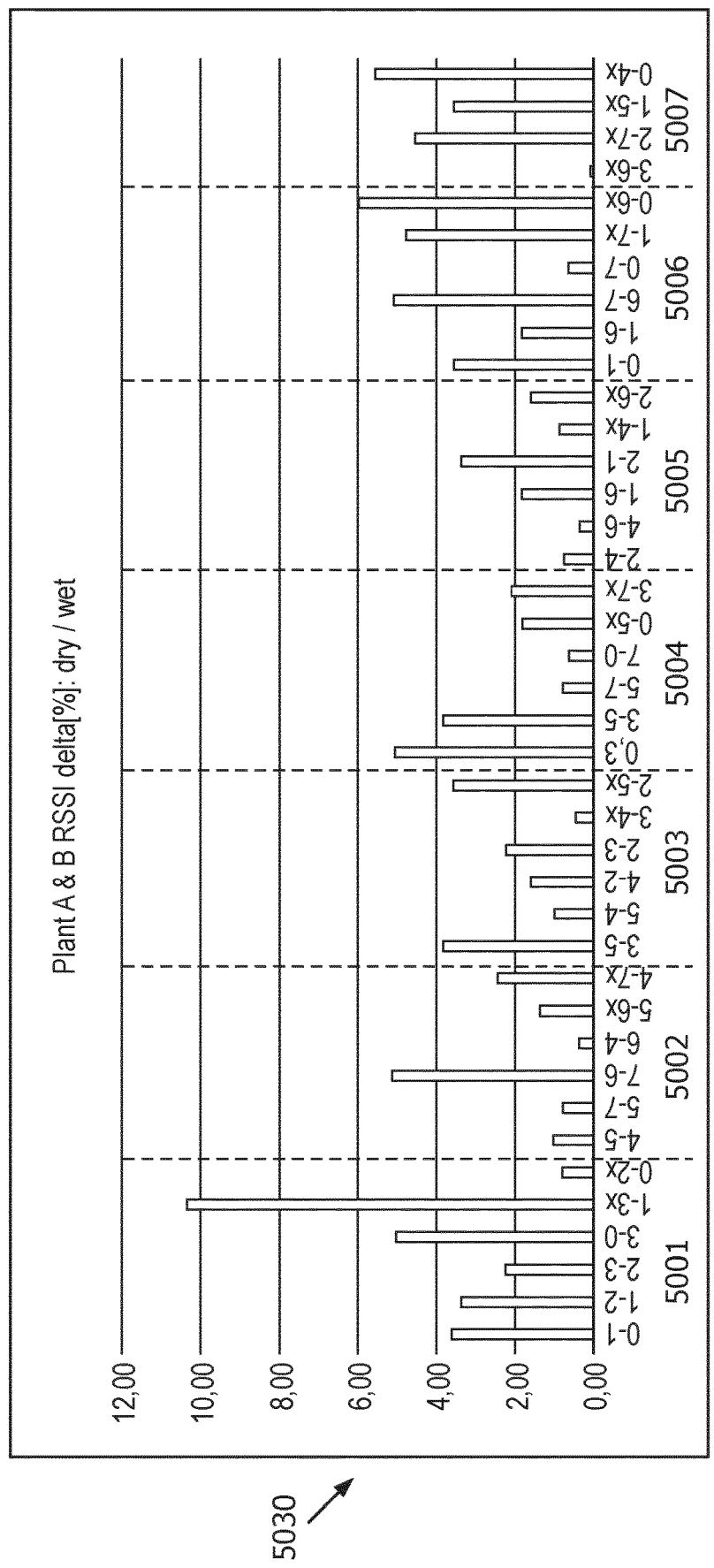
Continuation of FIG. 6

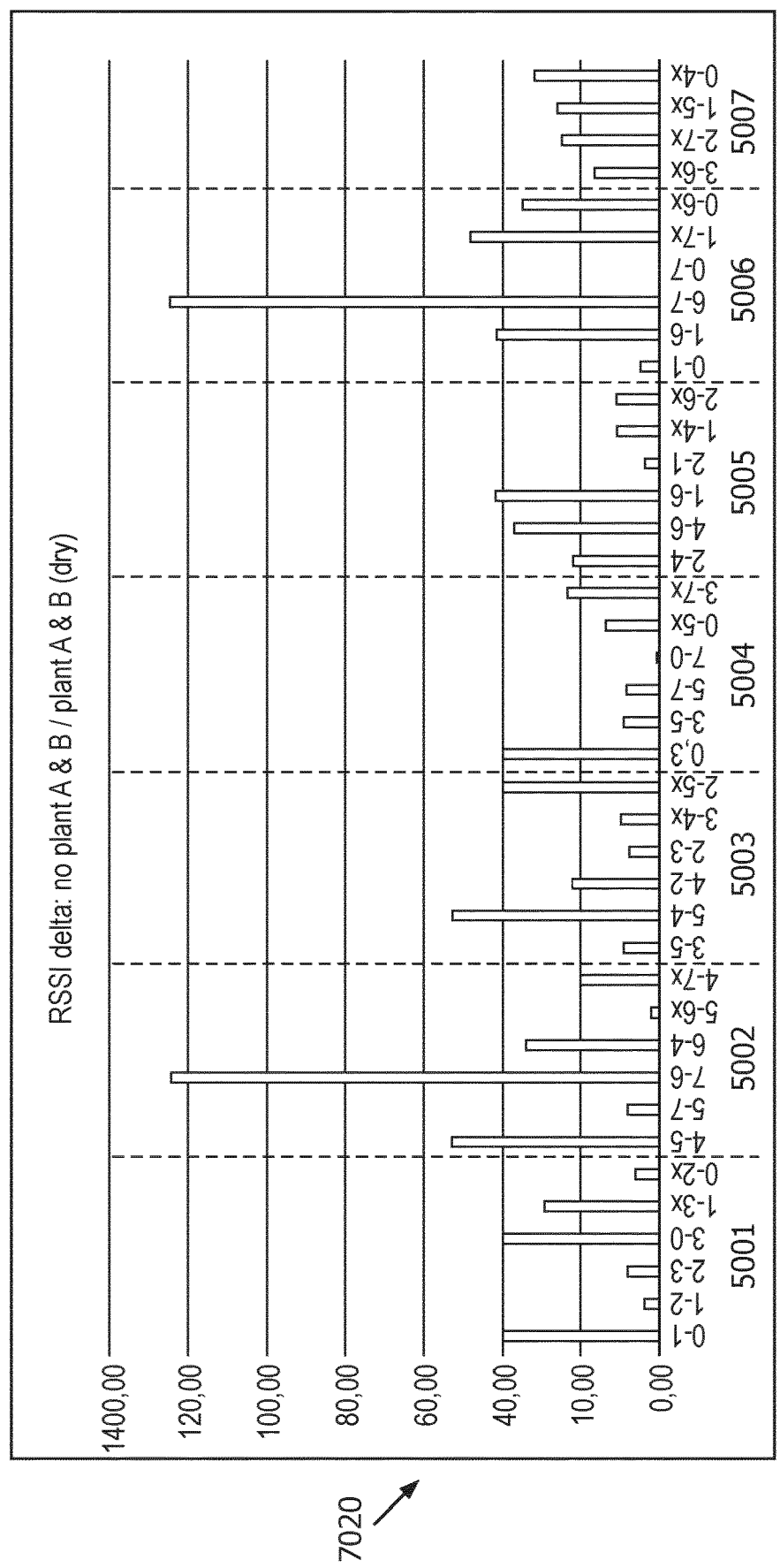
Continuation of FIG. 7

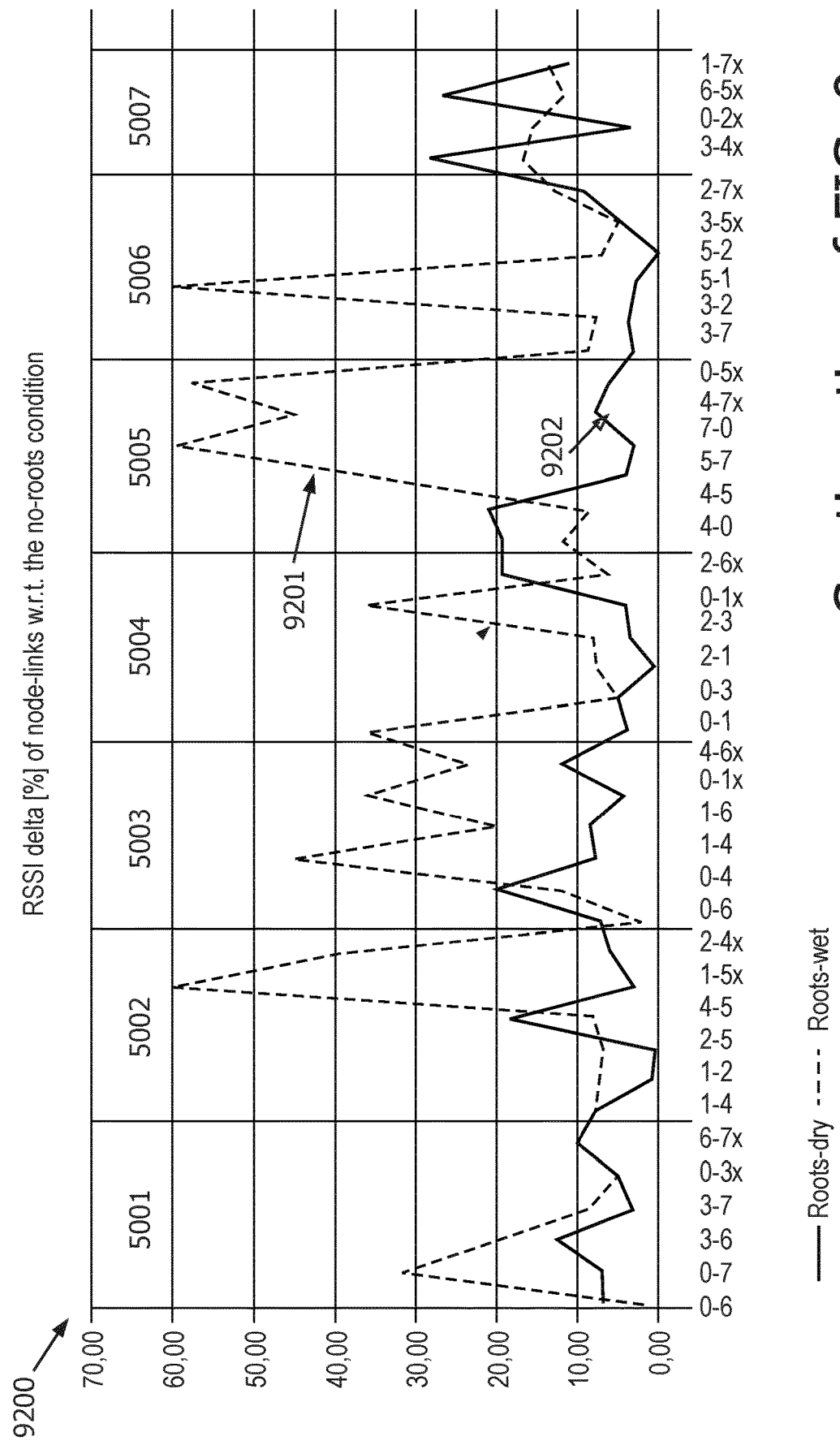

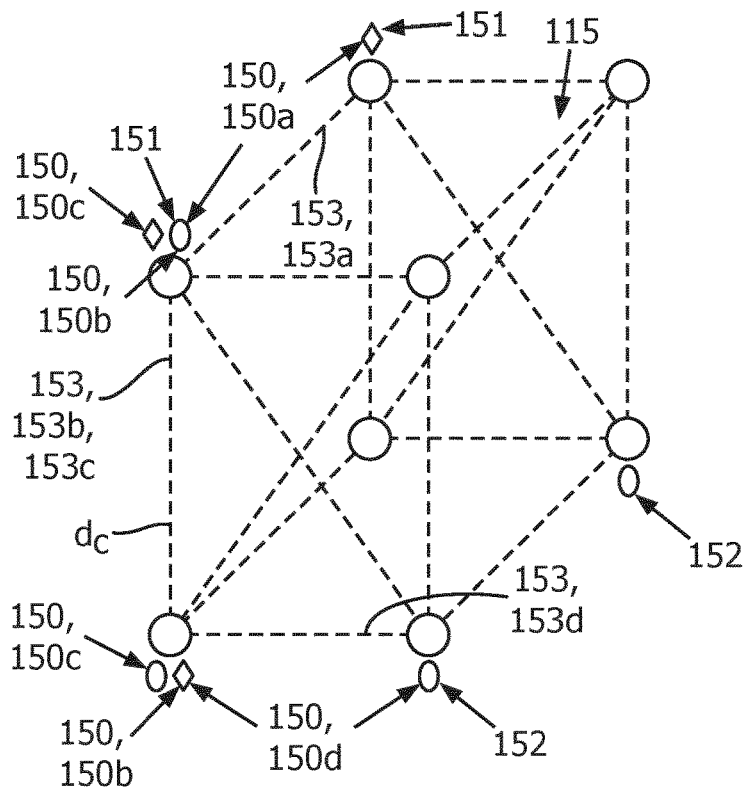
FIG. 10
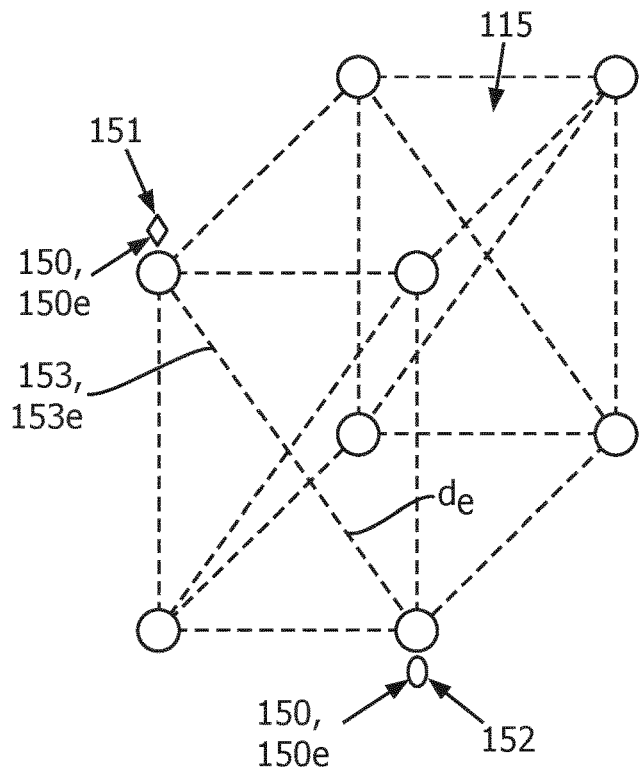
Continuation of FIG. 10

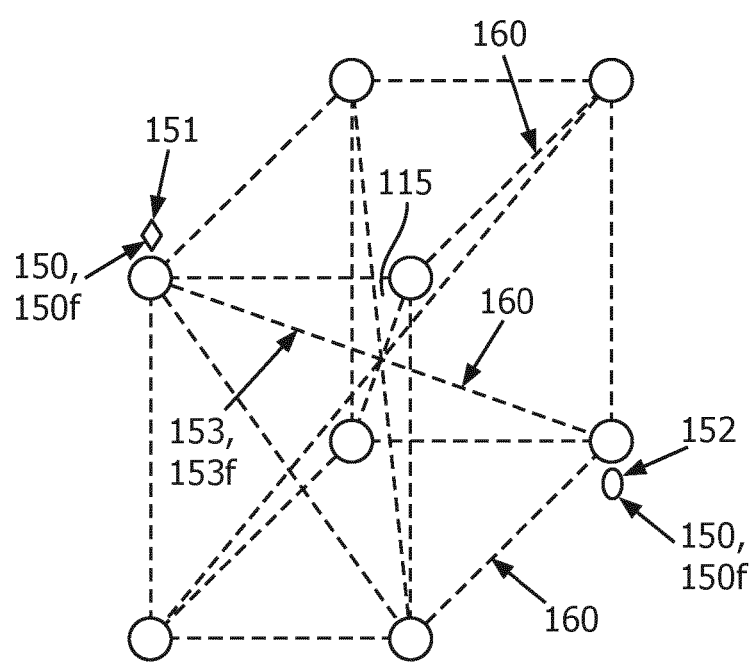
Continuation of FIG. 10

HORTICULTURE SYSTEM AND METHOD

CROSS-REFERENCE TO PRIOR APPLICATIONS

This application is the U.S. National Phase application under 35 U.S.C. § 371 of International Application No. PCT/EP2021/060179, filed on Apr. 20, 2021, which claims the benefit of U.S. Provisional Patent Application No. 63/015,731, filed on Apr. 27, 2020, U.S. Provisional Patent Application No. 63/015,733, filed on Apr. 27, 2020, U.S. Provisional Patent Application No. 63/015,736, filed on Apr. 27, 2020, U.S. Provisional Patent Application No. 63/015,739, filed on Apr. 27, 2020, European Patent Application No. 20173863.0, filed on May 11, 2020, European patent application No. 20173871.3, filed on May 11, 2020, European Patent Application No. 20173878.8, filed on May 11, 2020 and European Patent Application No. 20173883.8, filed on May 11, 2020. These applications are hereby incorporated by reference herein.

FIELD OF THE INVENTION

The invention relates to a method for sensing a plant-related parameter. The invention further relates to a computer program product. The invention further relates to a horticulture system.

BACKGROUND OF THE INVENTION

Methods for sensing a plant-related parameter are known in the art. WO2015006675A2, for instance, describes a system for a plant parameter detection, including: a plant morphology sensor having a first field of view and configured to record a morphology measurement of a plant portion and an ambient environment adjacent the plant, a plant physiology sensor having a second field of view and configured to record a plant physiology parameter measurement of a plant portion and an ambient environment adjacent the plant, wherein the second field of view overlaps with the first field of view; a support statically coupling the plant morphology sensor to the physiology sensor, and a computing system configured to: identify a plant set of pixels within the physiology measurement based on the morphology measurement; determine physiology values for each pixel of the plant set of pixels; and extract a growth parameter based on the physiology values.

SUMMARY OF THE INVENTION

Horticulture is the branch of agriculture that deals with the art, science, technology, and business of growing plants. It may include the cultivation of medicinal plants, fruits, vegetables, nuts, seeds, herbs, sprouts, mushrooms, algae, seaweeds and non-food plants such as grass, ornamental trees and flowers.

Plants use the process of photosynthesis to convert light, $CO_2$ and $H_2O$ into carbohydrates (sugars). These sugars are used to fuel metabolic processes and for biomass formation. This biomass formation may include stem elongation, increase of leaf area, flowering, fruit formation, etc.

The space available for food production may be becoming scarcer. Hence innovation in production methods may be needed to deliver higher yields from smaller footprints, while becoming more sustainable (minimum use of energy and water). Producing food in closed environments such as plant farms is a method to meet these demands. In plant farms (also known as plant factories, vertical farms or city farms), food may be grown in multiple layers, making better use of the available space as compared to outdoor growth or growth in greenhouses. This implies that in plant farms natural sunlight will not be able to reach all plants and a substantial proportion of the light may need to come from artificial lighting. In plant farms, there is a desire for providing a controlled environment suitable for, especially tailored for, the cultivation of plants.

In particular, there may be a desire to monitor plant growth in the plant farm, and to take growth-related actions to improve growth outcomes with regards to, for example, growth rate, differentiation, or disease/pest prevention, especially in dependence of a determined plant-related parameter.

An even approximate estimation of plant mass, such as the total leaf mass of a plant, may already provide valuable insights to the grower. For example, a leaf mass estimation may be used for detecting deficiencies during the plant's growth phase as well as predicting the yield at harvest. For instance, deviations from expected leaf appearance, plant mass and growth behavior may trigger the grower to inspect a certain area of a horticulture system for disease or for abnormal environmental conditions, or to adjust certain control parameters (for example irrigation or nutrient application).

Plants in horticulture systems may currently be primarily observed manually and/or with camera aid. Manual observations may be cumbersome and time-consuming, whereas camera observations may be restricted to frontal views.

Further, current state-of-the-art plant-monitoring solutions may utilize robots, which may disturb the plants; for instance, horticulture AI-sensing robots are known to damage stems and leaves when physically moving a camera within the leaf canopy.

Hence, there is an unmet need to reliably assess growth of horticulture plants in a noninvasive way. In addition, camera-based image processing can only provide an indication of plant size and the plant's outer shape. Hence, measuring the volume or weight of a plant's leaf canopy before harvesting may be challenging for prior art technologies; for example, multispectral image processing might provide insufficient volumetric information as it may rely on 2D or stereo-camera images. To obtain volumetric insights with prior art technologies, the grower may for instance need to mount a very large number of cameras spread at close distance throughout the whole indoor-farming space, which may be both disruptive for horticulture processes and may be economically prohibitive.

Hence, it is an object of the invention to provide an alternative method, sensor and/or horticulture system for cultivating a plant, which preferably further at least partly obviate(s) one or more of above-described drawbacks. The present invention may have as object to overcome or ameliorate at least one of the disadvantages of the prior art, or to provide a useful alternative.

The present invention is defined by the set of independent claims and dependent claims.

Hence, in a first aspect, the invention provides a method for sensing, especially monitoring, a plant-related parameter in a horticulture space, especially a horticulture space for hosting a plant. Especially, a radio transmitter (also: "transmitter") and a radio receiver (also: "receiver") may be arranged such that a radio path between the radio transmitter and the radio receiver passes through (or: "crosses") at least part of the horticulture space. Further, the radio receiver may be configured in a radio signal receiving relationship with the radio transmitter. Further, the method may comprise a baseline generation stage. The baseline generation stage may comprise: (i) emitting a baseline radio signal from the radio transmitter; (ii) detecting the baseline radio signal with the radio receiver and providing a related baseline receiver signal. Further, the method may comprise a sensing stage comprising: (i) emitting a radio signal with the radio transmitter, especially wherein the radio signal comprises a radio frequency, i.e., a frequency selected from a radio frequency range; (ii) detecting the radio signal with the radio receiver and providing a related receiver signal (also: "receiver signal"), especially a raw and/or processed related receiver signal; and (iii) determining (a value of) the plant-related parameter based on the (related) receiver signal and the (related) baseline receiver signal.

In an embodiment, the plant related parameter comprises a plant volumetric parameter selected from the group comprising a leaf volume, a density of a leaf canopy, a stem volume, a root volume, a fruit volume, a seed volume, and a nut volume.

In an embodiment, the radio transmitter and the radio receiver may respectively be a ZigBee radio transmitter and a ZigBee radio receiver.

In an embodiment, the plant-related parameter may be a leaf volume or a fruit; wherein the method comprises selecting a radio frequency of the radio signal in the range of 0.5 GHz-5.0 GHz to detect said leaf volume or said fruit.

In an embodiment, the plant-related parameter may be a plant root; wherein the method comprises selecting a radio frequency of the radio signal in the range of 20-120 GHz to detect said plant root.

The invention provides the benefit that the plant-related parameter is determined via a radio signal. As a radio signal interacts with an object, herein especially the plant, the radio signal may be affected, such as partially absorbed, diffracted, scattered and reflected. The type and extent of this effect may depend on a variety of factors, including, for example, object material, object shape, object size, radio frequency etc. Hence, by providing a radio signal from the radio transmitter to the radio receiver via a radio path that at least partially passes through a horticulture space, observations may be made with respect to a plant arranged in the horticulture space, i.e., the radio signal may at least partially pass through (or: "travel through") the horticulture space, and observations may be made with respect to a plant arranged in the horticulture space based on changes in the radio signal. In particular, the method of the invention may facilitate sensing volumetric plant-related parameters, such as a leaf volume, a root volume, or a fruit volume.

The prior art may generally consider the interaction between a plant and a radio signal undesirable, as the plant may interfere with radio communication, especially in that plants may act as disturbances in a wireless radio path and cause absorption, blockage and scattering of radio signals. Here, however, the interaction is taken advantage of to provide improved sensing of a plant-related parameter.

In particular, the invention may relate to sensing with radio frequency (RF) to analyze variations in wireless signal strength and/or wireless multipath propagation, especially compared to baselines (see below); RF sensing measurements may be taken during the plant growth with an RF sensing baseline recorded. The RF sensing baseline may preferably relate to a support and substrate without any seed, tulip bulb or seedling in it. The RF sensing baseline may also be recorded before significant growth of the plant has occurred (in the baby plant stage, the RF sensing will be dominated by the horticulture space, especially the horticulture arrangement, such as a support+substrate). By comparing the RF sensing measurement with the (plant-free) baseline, the current (average) density of a leaf canopy in a horticulture space may be determined.

Even further: The key to successfully suppressing diseases in the horticultural domain is to keep the plant canopy dry, especially from dusk to dawn. However, in practice, on certain locations in e.g. a greenhouse, the air may accidentally cool to the dew point (e.g. due to heating-system nonuniformities, or infrastructural defects such as broken windows, etc.); hence condensation may occur, and water droplets may be formed on cooler surfaces such as the leaves of plants and e.g. glazing. This moisture promotes the germination of fungal pathogen spores such as *Botrytis* and powdery mildew.

Moreover, condensation on plants is well known to lead to molding and hence plant yield loss. Moreover, condensation on non-plant objects also can lead to dripping water, which often results in a water puddle away from the dripping non-plant object. The water accumulation leads to a local rise of the humidity and hence may cause unwanted condensation on plants. Avoiding condensation is therefore a major challenge for growers.

Next to increasing the humidity, such a water puddle will result in a local cooling effect of the plants as the water evaporation from the puddle takes away energy, resulting in a local drop in temperature. In addition, locally denser plant foliage may result in local microclimates with higher humidity and risk of condensation.

Dripping water from condensation occurring on the surrounding surfaces (e.g. bottom of the upper tray in vertical farming) may also wet plant surfaces and spread plant pathogens from plant to plant by splashing soil and plant debris. The negative effects of dripping water might may become even more severe if the upper and lower trays carry different plant types, or plants at different stages in their growth curve, as the diseases of the upper first plant might be even more damaging to the second plant on the bottom tray.

For example, sensing technologies such as computer-vision cameras are ill suited to pick up water condensation at all locations within a greenhouse. In addition, cameras only pick up the visible top of a plant canopy within such a greenhouse. Hence, in indoor horticulture there is an unmet need to assess water condensation in a nondisruptive way within the plant canopy. Similar needs may be defined for other forms of water within the horticulture space.

Therefore, undesired presence of various forms of water in a horticultural space may render problems affecting plant health and plant growth.

Hence, in examples throughout the application, the plant related parameter may mutatis mutandis be a water-related parameter.

In an embodiment, the plant-related parameter may be a water-related parameter; wherein the water-related parameter may comprise the presence of water, an amount of water and/or an amount of water condensation on the plant; OR wherein the water-related parameter may comprise a presence of water, an amount of water, a water level, or a water distribution in a substrate of the plant.

In an additional embodiment thereof, the method may comprise selecting a radio frequency of the radio signal in the range of 60-120 GHz to detect said water-related parameter.

In an alternative embodiment, the radio transmitter and the radio receiver may respectively be a ZigBee radio transmitter and a ZigBee radio receiver.

Hence, in aspects, the invention may provide a method for sensing a water-related parameter in a horticulture space, wherein (i) a radio transmitter and a radio receiver are arranged such that a radio path between the radio transmitter and the radio receiver passes through at least part of the horticulture space, and (ii) the radio receiver is configured in a radio signal receiving relationship with the radio transmitter, wherein the method comprises a sensing stage comprising: emitting a radio signal with the radio transmitter; detecting the radio signal with the radio receiver and providing a related receiver signal; and determining the water-related parameter based on the receiver signal.

In aspects, this method may comprise a baseline generation stage. The baseline generation stage may comprise: (i) emitting a baseline radio signal from the radio transmitter; (ii) detecting the baseline radio signal with the radio receiver and providing a related baseline receiver signal. In such embodiments, the sensing stage may comprise determining the water-related parameter based on the receiver signal and the baseline receiver signal.

In aspects, the water-related parameter may comprise at least one of: a presence of water, an amount of water, a water level, an amount of water condensation, an amount of water vapor, humidity or relative humidity, and/or a concentration of mist. For example, the water-related parameter (which may be determined by the described radiofrequency based sensing) may be water condensation or water droplets on a leaf of a plant. For example, the water-related parameter (which may be determined by the described radiofrequency based sensing) may be the presence of water in a horticulture tray. For example, the water-related parameter (which may be determined by the described radiofrequency based sensing) may be relative humidity or an amount of water vapor in a horticulture space, such as a greenhouse (area). For example, the water-related parameter (which may be determined by the described radiofrequency based sensing) may be mist provided in a horticulture space. Said water level may also be a water depth. For example, sensing the water-related parameter may comprise sensing the water level or water depth in a hydroponics arrangement, wherein the horticulture space comprises said hydroponics arrangement.

Thus, the processes and advantages described for sensing the plant related parameter may mutatis mutandis apply to said water related parameter.

Further, for example, abnormalities such as accidental water leakage from pipes or clogged sprinklers or unwanted condensation on a plant (which may lead to molding of the plant) or even air drafts within a horticulture system, which may "blow dry" the leaves faster after application of water mist may be detected. The RF sensing may, for example, be used to create irrigation heatmaps visualizing to the grower local non-uniformities of the irrigation or ventilation systems in the horticulture system and hence help to facilitate homogeneous growth across the plants.

More specifically, in an embodiment, the horticulture space may comprise at least one plant; wherein the radio path passes through at least part of the at least one plant; wherein the water-related parameter comprises the presence of water, an amount of water and/or an amount of water condensation on the at least one plant. For example, the water-related parameter may be the amount of water condensation on a plant, such as water droplets on the leaf of a plant, or on a canopy of a plant. Hence, the method and apparatus (i.e. horticulture system) according to the invention may determine such water droplets on the leaf of a plant via radiofrequency sensing; because the radio transmitter and radio receiver are arranged such that the radio path passes through at least part of the horticulture space and passes through at least part of the at least one plant. Thus, said at least one plant may also be a part of the at least one plant, such as a leaf, a canopy, a fruit, a seed, a root, and/or a stem.

In embodiments, the horticulture space may comprise a substrate or at least one substrate. The term "substrate" may herein especially refer to a surface or material on which a plant lives, growth, and/or obtains its nutrients from. The substrate may especially at least partially surround the roots of the plant. In further embodiments, the substrate may comprise soil. In further embodiments, the substrate may comprise rockwool.

Said substrate or at least one substrate may for example be a horticulture tray, or a growth layer. Said at least one substrate may be a bucket or a container.

More specifically, in an embodiment, the horticulture space may comprise at least one substrate; wherein the radio path passes through at least part of the at least one substrate; wherein the water-related parameter comprises a presence of water, a water level and/or an amount of water in the at least one substrate. Similarly, the water-related parameter may comprise an amount of water condensation on the at least one substrate. For example, the water-related parameter may be the amount of water in the substrate, such as the present invention providing said radiofrequency sensing to determine the amount of water in a horticulture tray (i.e. e.g. compared to a dry baseline) due to the radio path passing through at least part of said horticulture tray. For example, the water-related parameter may be the presence of water in a growth layer, which may for example indicate an undesired (e.g. local) flooding of the growth layer which may be growing plants that do not require water at that particular moment of the growth phase. Similar examples may be envisioned, also vice versa, thus radiofrequency sensing for determining the presence of water to confirm that a watering action associated with e.g. said horticulture tray or growth layer is performed accordingly. For example, if it is determined that the humidity level of the at least one substrate is deemed too low (or too high), or if a humidity uniformity is insufficient, this may inform and improve future watering actions.

In examples, said substrate may for example comprise Rockwool Wherein the water-related parameter may comprise an amount of water, or a water level, of a water distribution in said Rockwool. The substrate may also be natural soils.

In some aspects, the horticulture space may comprise an atmospheric volume; wherein the radio path passes through at least part of the atmospheric volume; wherein the water-related parameter comprises a water level, humidity or relative humidity of said atmospheric volume, and/or wherein the water-related parameter comprises the presence of water and/or a concentration of mist in said atmospheric volume. For example, the atmospheric volume may be a horticultural control volume, may be an incubator, may be a control volume around a growth layer, may be a part of a greenhouse, may be a greenhouse, may be an interior volume of a fluid supplying tube. For example, the water-related parameter may be relative humidity, such that the method and apparatus (i.e. horticulture system) according to the invention may determine relative humidity of a part of a greenhouse in which plants are grown. For example, the water-related parameter may be a concentration of mist, such that the method and apparatus (i.e. horticulture system) according to the invention may determine the concentration of mist provided to a particular growth layer. Such an embodiment may also be advantageous for unobtrusively determining the proper functioning of a misting system within the horticulture space.

Hence, all in all, the invention provides a method for sensing, especially monitoring, a plant-related parameter or a water-related parameter in a horticulture space, especially a horticulture space configured for hosting a plant.

In further aspects, the invention may define a plurality of radio transmission pairs that are configured in a radio signal receiving relationship, so as to sense the plant related parameter according to the invention.

Hence, in aspects, the method according to the invention may comprise a plurality of radio transmission pairs configured in radio signal receiving relationships, especially wherein each radio transmission pair comprises a (respective) radio transmitter and a (respective) radio receiver, especially arranged such that a radio path (or "(wireless) communication path") between the (respective) radio transmitter and the (respective) radio receiver passes through at least part of the horticulture space. The method may further comprise a selection stage and a sensing stage. The selection stage may comprise selecting a proper sensing subset (also: "sensing subset") of the plurality of radio transmission pairs, especially in dependence of an input parameter, such as an input parameter selected from the group consisting of a plant characteristic (of the plant), a variable environmental parameter, and a static environmental parameter. The sensing stage may comprise determining (a value of) the plant-related parameter (in relation to the plant), especially based on a receiver signal of the (radio receivers of the) proper sensing subset.

In an embodiment, the selection stage may comprise comparing signal quality indicators of one or more of the plurality of radio transmission pairs in a plant presence condition and in a plant absence condition to determine a plant presence effect, and to select the proper sensing subset based on the plant presence effect In an embodiment, the selection stage may comprise comparing signal quality indicators of one or more of the plurality of radio transmission pairs in a moist leaves condition and in a dry leaves condition to determine a leaf moisture effect, and to select the proper sensing subset based on the leaf moisture effect.

In an embodiment, the selection stage may comprise selecting the proper sensing subset based on height differences within the radio transmission pairs, wherein the proper sensing subset comprises at least one radio transmission pair of which the radio transmitter and the radio receiver are arranged at different heights.

In an embodiment, the selection stage may comprise selecting a plurality of proper sensing subsets, wherein the method comprises a plurality of sensing stages, wherein each of the plurality of sensing stages comprises determining the plant-related parameter based on the receiver signal of the proper sensing subset.

In an embodiment, the radio transmitters and the radio receivers are comprised by horticulture light generating devices, wherein the horticulture light generating devices are configured to provide horticulture light to the plant.

Herein, the term "plant" is used to refer essentially to any species selected from medicinal plants, vegetables, herbs, sprouts, mushrooms, plants bearing nuts, plants bearing seeds, plants bearing flowers, plants bearing fruits, non-food crops such as grass and ornamental trees, etc. The term "plant" herein may especially refer to Archaeplastida. The Archaeplastida are a major group of eukaryotes, comprising the red algae (Rhodophyta), the green algae, and the land plants (including aquatic plants), together with a small group of freshwater unicellular algae called glaucophytes. Hence, in embodiments the plant may be a land plant. In further embodiments the plant may be an alga (such as one or more of green algae and red algae and unicellular algae called glaucophytes). Further, the term "plant" may herein refer to essentially all stages of plant development. The term "plant" may especially refer to a plurality of (different) plants.

The term "plant part" may herein especially refer to a part of a plant, such as a root, stem, leaf, fruit (if any), flower (if any), nut (if any) etc. Further, the term "plant part" may especially refer to a plurality of (different) plant parts.

The plant-related parameter may comprise any parameter related to a plant, especially a plant volumetric parameter, or especially a growth-related parameter, such as an environmental parameter.

The plant may especially be a type of crop. The term "crop" may herein be used to refer to a plant species or variety that is grown to be harvested as e.g. food, livestock fodder, fuel, or for any other economic purpose. The term "crop" may also relate to a plurality of crops. The term "crop" may herein especially refer to food crops (tomatoes, peppers, cucumbers and lettuce), as well as to plants (potentially) bearing such crops, such as a tomato plant, a pepper plant, a cucumber plant, etc. Examples of crop plants are rice, wheat, barley, oats, chickpea, pea, cowpea, lentil, green gram, black gram, soybean, common bean, moth bean, linseed, sesame, khesari, sunhemp, chillies, brinjal, tomato, cucumber, okra, peanut, potato, corn, pearlmillet, rye, alfalfa, radish, cabbage, lettuce, pepper, sunflower, sugarbeet, castor, red clover, white clover, safflower, spinach, onion, garlic, turnip, squash, muskmelon, watermelon, cucumber, pumpkin, kenaf, oilpalm, carrot, coconut, *papaya*, sugarcane, coffee, cocoa, tea, apple, pears, peaches, cherries, grapes, almond, strawberries, pine apple, banana, cashew, irish, cassava, taro, rubber, sorghum, cotton, triticale, pigeonpea, and tobacco.

The horticulture space (or: "plant cultivation space") may refer to any space dedicated for hosting a plant, especially in a horticulture setting. The term "horticulture" may herein refer to (intensive) plant cultivation for human use and is very diverse in its activities, incorporating food plants (fruits, vegetables, mushrooms, culinary herbs, including feed) and non-food plants (flowers, trees and shrubs, turfgrass, hops, grapes, medicinal herbs). In particular, the term "horticulture space" may herein refer to any space where growth lighting fixtures (giving artificial light) are used to facilitate plant growth. In the future this could not just be vertical farming or inside a greenhouse, but also in outdoor settings where the artificial lighting complements the daylighting and improves plant growth.

In embodiments, the horticulture space may especially refer to a space comprising one or more of a substrate, air, and water, wherein the horticulture space is configured for hosting a plant. For example, in a vertical farm, a horticulture space may comprise a volume essentially defined by horticulture arrangements, such as trays. Generally, for example, a vertical farm may comprise a plurality of horticulture spaces separated by walkways and/or (layered) horticulture arrangements.

In embodiments, a radio transmitter and a radio receiver may be arranged such that a radio path between the radio transmitter and the radio receiver passes through at least part of the horticulture space. Especially, the radio receiver may be configured in a radio signal receiving relationship with the radio transmitter, especially along the radio path.

The term "radio transmitter" may herein refer to any device capable of sending a radio signal. The term "radio signal" may herein especially refer to radiation having a frequency selected from a radio frequency range, especially from the range of 0.5-120 GHz. In embodiments, the radio transmitter may be comprised by a (first) radio, i.e., an element capable of both sending and receiving a radio signal.

Even further, the term "radio signal" may herein especially refer to radiation having a frequency selected from a radio frequency range from the range of 60-120 GHz; because frequencies above 60 GHz may be particularly suited to determine the various forms of water with the method and apparatus of the present invention, such as mist, water condensation, and/or water vapor.

The term "radio receiver" may herein refer to any device capable of receiving a radio signal and to provide a related receiver signal. In particular, the radio receiver may be configured in a radio signal receiving relationship with the radio transmitter, i.e., the radio receiver may be configured to receive a radio signal transmitted by the radio transmitter. In particular, the radio receiver may be configured for passively receiving the radio signal transmitted by the radio transmitter, i.e. receiving signals from transmitters but without being specifically timed/orchestrated to know exactly when the transmission will take place. In other words, with regards to passive reception, it is not a coordinated sequence where the receiver knows exactly when each device will transmit (potentially as a response to a trigger the receiver sent first); instead, the receiver is listening to any type of commands, and if it receives a message destined to be used for sensing, it applies a specific action if needed. Further, in embodiments, passive sensing may also refer to the situation where the device receiving a message is not the same device that transmitted it, as opposed to what may happen with radar-based technologies where a single device transmits a signal and determines a parameter based on the received reflection of that signal. In embodiments, the radio receiver may be comprised by a (second) radio.

The term "radio path" (also: "wireless communication path") may herein refer to a path between the radio transmitter and the radio receiver, wherein a radio signal sent by the radio transmitter can travel along the radio path prior to being detected by the radio receiver. As the radio path passes through at least part of the horticulture space, the radio signal as received by the radio receiver may comprise information pertaining to the horticulture space. Given that a radio signal may be reflected by an object, there may also be a plurality of radio paths between the radio transmitter and the radio receiver. In general, in embodiments, there may be a plurality of radio paths between the radio transmitter and the radio receiver. In embodiments, the radio path may especially be an (essentially) straight path between the radio transmitter and the radio receiver.

In embodiments, the radio signal may especially be indicative of a control command arranged for controlling an electrical device. The electrical device may especially be a horticulture device, such as a lighting device, sensor, and/or actuator (see also below). Hence, in embodiments, radio signals already being used for controlling electrical devices in a horticulture environment, especially a horticulture system, (first function) may be used for the RF-based sensing (second function), especially next to the alternative of using dedicated RF signals for the RF-based sensing.

In embodiments, the method may comprise a sensing stage. The sensing stage may comprise emitting (also "transmitting") a radio signal with the radio transmitter. The sensing stage may further comprise detecting (or: "receiving") the radio signal with the radio receiver and providing a related receiver signal, especially a raw and/or processed related receiver signal. The sensing stage may further comprise determining (a value of) the plant-related parameter based on the receiver signal.

The term "related receiver signal" may herein refer to any signal provided by the radio receiver that is related to, especially at least partially based on or derived from, the radio signal as detected by the radio receiver. Hence, the related receiver signal may comprise the raw radio signal (as received). Further, the related receiver signal may comprise a processed radio signal; for example, the related receiver signal may comprise a message parameter extracted from the radio signal (as received).

In embodiments, the sensing stage may comprise the execution of a (computational) analysis, especially a computational algorithm, to determine the plant-related parameter based on the receiver signal. The sensing stage may especially comprise determining the plant-related parameter based on (a comparison between) the receiver signal and the radio signal (as sent by the radio transmitter). It will be clear to the person skilled in the art that the radio signal will be affected by the plant in a plant-part-specific and wavelength-specific manner, thereby facilitating determining the plant-related parameter.

In specific embodiments, the invention provides a method for sensing a plant-related parameter in a horticulture space, wherein (i) a radio transmitter and a radio receiver are arranged such that a radio path between the radio transmitter and the radio receiver passes through at least part of the horticulture space, and (ii) the radio receiver is configured in a radio signal receiving relationship with the radio transmitter, wherein the method comprises a sensing stage comprising: emitting a radio signal with the radio transmitter; detecting the radio signal with the radio receiver and providing a related receiver signal; and determining the plant-related parameter based on the receiver signal.

The sensing of the plant-related parameter may benefit from sensing from, for example, multiple angles and/or multiple sides. In particular, different radio paths may be more suitable for particular plant-related parameters. A variety of radio paths may thus result in the potential to measure more plant-related parameters, as well as to obtain higher quality measurements, such as for example of a volumetric plant parameter.

Hence, in embodiments, a plurality of radio transmitters and/or radio receivers may be arranged in and/or around the horticulture space. In particular, a plurality of radio transmission pairs may be configured in radio signal receiving relationships, wherein each radio transmission pair comprises a (respective) radio transmitter and a (respective) radio receiver arranged such that a (respective) radio path between the (respective) radio transmitter and the (respective) radio receiver passes through at least part of the horticulture space.

In further embodiments, a plurality of radio transmitters may be arranged in and/or around the plant cultivation space. In such embodiments, the sensing stage may comprise (sequentially) emitting radio signals from radio transmitters of the plurality of radio transmitters, especially (sequentially) emitting radio signals from single radio transmitters of the plurality of radio transmitters. Further, the sensing stage may comprise (continuously) detecting the (sequentially) emitted radio signals with the radio receiver.

In further embodiments, a plurality of radio receivers may be arranged in and/or around the horticulture space. In such embodiments, the sensing stage may comprise (sequentially) emitting radio signals from the radio transmitter, and (continuously) detecting the (sequentially) emitted radio signals with the plurality of radio receivers.

In further embodiments, a plurality of radio transmitters and radio receivers may be arranged in and/or around the horticulture space. In yet further embodiments, a plurality of radio communication pairs may be arranged in and/or around the horticulture space, especially wherein each radio communication pair may comprise a (respective) radio transmitter and a (respective) radio receiver. In such embodiments, the sensing stage may comprise (simultaneously) emitting radio signals from radio transmitters of (at least part of) the plurality of radio communication pairs, especially (simultaneously) emitting radio signals from single radio transmitters of the plurality of radio communication pairs. Further, the sensing stage may comprise (continuously) detecting the (simultaneously) emitted radio signals with the (respective) radio receivers. In particular, in further embodiments, a radio may comprise a radio transmitter and a radio receiver, wherein the radio transmitter is configured in a radio signal receiving relationship with a second radio receiver, and wherein the radio receiver is configured in a radio signal receiving relationship with a second radio transmitter, and wherein the radio the sensing stage comprises simultaneously (or: "concurrently") emitting radio signals from the radio transmitter and the second radio transmitter, and detecting the simultaneously emitted radio signals with the second radio receiver and the radio receiver, respectively.

In embodiments, the radio transmitter may be comprised by a first horticulture device (or: "first horticulture element"), and/or the radio receiver may be comprised by a second horticulture device (or: "second horticulture element"). In particular, the radio transmitter and/or the radio receiver may be integrated into horticulture devices (or "elements") that are commonly employed in horticulture systems. For example, in further embodiments, the first (or second) horticulture device may comprise one or more of a horticulture light generating device, a horticulture light control element, especially a wall switch or occupancy sensor, a (horticulture tray) actuator, a sensor, a horticulture temperature control element, a horticulture robot, etc. In further embodiments, the horticulture device may comprise a horticulture light generating device.

In embodiments, the horticulture system may comprise a plurality of horticulture devices, a plurality of radio transmitters, and a plurality of radio receivers, wherein each of (at least part of) the plurality of horticulture devices comprises a (respective) radio transmitter of the plurality of radio transmitters, and wherein each of (at least part of) the plurality of horticulture devices comprises a (respective) radio receiver of the plurality of radio receivers, The integration of the radio transmitter and/or the radio receiver in commonly employed horticulture elements, may provide the benefit that the radio transmitter and/or radio receiver are integrated in elements that are already going to be present in a horticulture system, rather than that additional elements need to be added, for which additional space may otherwise need to be dedicated. Integration of (at least part of) a plurality of radio transmitters and/or of (at least part of) a plurality of radio receivers in horticulture light generating devices may be particularly beneficial, as horticulture light generating devices may generally be spread out across a horticulture space. Especially horticulture light generating devices may be spatially arranged in a (highly) repetitive pattern, which may facilitate analyzing the receiver signal, and which may facilitate extrapolating suitable sensing parameters determined for one radio transmission pair to a second radio transmission pair.

Hence, in further embodiments, a plurality of radio transmitters and radio receivers may be spatially arranged in and/or around the horticulture space according to a repeating pattern.

The plant-related parameter may comprise any parameter relevant for cultivation of the plant (in the horticulture space). Further, the term "plant-related parameter" may also refer to a plurality of plant-related parameters.

As partly mentioned, the plant-related parameter may comprise a plant volumetric parameter, especially a plant volumetric parameter selected from the group comprising a leaf density, a leaf size, a leaf length, a leaf volume, a stem volume, a root volume, a fruit volume, a seed volume, and a nut volume, especially from the group consisting of a leaf volume, a stem volume, a root volume, a fruit volume, a seed volume, and a nut volume.

In further embodiments, the plant-related parameter may comprise a growth-related parameter, especially a growth-related parameter selected from the group comprising an air-related parameter, a substrate-related parameter, a leaf volume and a weed volume. For example, the growth-related parameter may comprise a weed volume, wherein the weed volume may especially refer to the volume of a second unwanted plant negatively affecting the growth of the plant, particularly wherein the second unwanted plant may use the desired first plant as a means of vertical support to reach higher areas on the plant canopy with more light (similar to a liana on a tree).

As will be clear to the person skilled in the art, the different categories of plant-related parameters are not necessarily mutually exclusive. For example, the leaf volume of a plant may be both a plant volumetric parameter and a growth-related parameter, as the leaves may perform photosynthesis, and may thereby contribute to plant growth.

In embodiments, the horticulture space may comprise a substrate. The term "substrate" may herein especially refer to a surface or material on which a plant lives, growth, and/or obtains its nutrients from. The substrate may especially at least partially surround the roots of the plant. In further embodiments, the substrate may comprise soil. In further embodiments, the substrate may comprise rockwool.

In further embodiments, the radio path may pass through at least part of the substrate, wherein the plant-related parameter comprises a substrate-related parameter selected from the group comprising a substrate humidity level, a substrate salinity level, a substrate humidity uniformity, a substrate density, a substrate thickness, a foreign object (in the substrate), such as a stone and/or a wood piece and/or another plant and/or an animal, and a substrate nutrient parameter, especially a nitrogen level, or especially a nitrogen level uniformity. As the substrate may provide both support and nutrition to the plant, its state may at least partially determine growth outcomes of the plant. Hence, by sensing the substrate-related parameter with the method of the invention, the substrate can be analyzed (over time) and modified if determined necessary or beneficial. For example, if it is determined that the substrate humidity level is deemed too low (or too high), or if the substrate humidity uniformity is insufficient, this may inform and improve future watering actions.

Interactions between the plant and the radio signal may, among others, depend on the frequency of the radio signal. For example, different radio frequencies may be absorbed by the plant, especially by the plant leaves, at different rates, which may further depend on whether or not the plant is in-leaf. Similarly, fruit may, generally, have different dimensions than leaves and may thus predominantly affect different radio frequencies than the plant leaves. Yet further, the radio signal may have positive and/or negative effects on the plant growth depending on the exposed plant part as well as the radio frequency.

Hence, in embodiments, the radio signal may be selected based on an input parameter, wherein the input parameter is selected from a plant characteristic, a time-dependent parameter, and an environmental parameter. In further embodiments, the radio signal may be selected from the range of 0.5-120 GHz, especially from the range of 0.9-60 GHz. In general, the higher the radio frequency, the more it may be absorbed by the plant. However, the absorption (and other interaction types) may differ, for example, for different plant types, leaf shapes and leaf sizes. In particular, higher frequencies may be impacted more by (smaller) leaves, as the size of the leaves may get in the area of the radio wavelength (a few cm), i.e., if the plant leaves dimensions are comparable to the wavelength of the radio signal, the radio signal may be significantly scattered by the leaves. Essentially, the higher the frequency, the more sensitive the RF signal may be to smaller objects. Specifically, when the wavelength of the RF signal has a length approximately the same or—particularly—smaller than the object, the interaction between the RF signal and the object may be stronger. Hence, by selecting the frequency, the sensitivity to different (parts of a) plant can be determined. For example, in embodiments, a frequency selected from the range of 0.5 GHz-5.0 GHz may be selected to detect fruits and/or (large) leaves. In further embodiments, a frequency selected from the range of 20-120 GHz, especially 25-100 GHz, may be selected to detect plant roots. It will be clear to the person skilled in the art that different frequencies may be suitable to detect same plant parts of different types of plants.

Further, some radio frequencies may negatively affect (a part of) a plant. For example, a radio frequency of about 900 MHz was described to inhibit the root growth of a particular bean by inducing oxidative stress. Hence, the radio frequency may be selected to avoid a negative effect of the radio signal on (a part of) the plant. Hence, in specific embodiments, different parts of the plant may be exposed to different radio frequencies.

Hence, in further embodiments, the method may comprise selecting the radio frequency in dependence of a plant characteristic, especially a plant characteristic selected from the group comprising the plant type, plant growth stage, fruit shape, fruit size leaf shape, and leaf size.

For RSSI sensing scattering (by leaves) may be disadvantageous. Hence in further embodiments, the plant leaves may have an (average) leaf dimension dL, wherein the method may comprise selecting the radio frequency such that the corresponding radio wavelength is at least 2.0 dL, especially wherein the leaf dimension is a leaf length, or especially wherein the leaf dimension is a leaf width.

For CSI sensing scattering (e.g., by leaves) may be advantageous. Hence in further embodiments, the plant leaves may have an (average) leaf dimension dL, wherein the method may comprise selecting the radio frequency such that the corresponding radio wavelength is in the range of 0.5 dL-2.0 dL, especially wherein the leaf dimension is a leaf length, or especially wherein the leaf dimension is a leaf width. For example, in embodiments, the corresponding wavelength may be selected from the range of 1 mm-20 cm. A wavelength of about 1 mm may, for example, be suitable for pine-like, especially spike-like, leaves, whereas a wavelength of about 20 cm may, for example, be suitable for wide leaves of small trees.

The term "radio signal" may also refer to a plurality of radio signals. Similarly, the term "radio frequency" may refer to a plurality of radio frequencies. In embodiments, the sensing stage may comprise sequentially emitting radio signals with the radio transmitter, especially wherein the sequentially emitted radio signals comprise (one or more) different radio frequencies. For example, during the sensing stage, such as at a specific growth stage of the plant, different radio frequencies may be provided (sequentially) to detect (a plant-related parameter related to) fruit (e.g. tomatoes) and to detect (a plant-related parameter related to) leaves.

In further embodiments, the radio frequency may be selected from one or more of 0.9 GHz, 1.3 GHz, 2.0 GHz, 2.4 GHz, 5 GHz, 11.6 GHz, 60 GHz.

The water in the plants may absorb some frequencies more than others; those frequencies may be most affected by the plants. In particular, some microwave frequencies (in the GHz range) may closely match the rotational frequency of water and can cause the water molecules to rotate, which may result in a strong absorption effect by the plant material. Hence, in embodiments, the radio frequency may be selected to match a rotational frequency of water.

The term "plant type" may herein refer to plants suited to a particular environment, such as a tropical plant, or such as an aquatic plant, but may herein further refer to a particular species (or genus) of a plant, especially a crop.

In particular, the radio frequency may be selected such that the radio signal is strongly affected by the plant-related parameter in view of the plant characteristic. For example, if the plant-related parameter comprises a leaf volume, the radio frequency may be selected in view of the leaf shape and leaf size of the plant, especially an expected leaf shape and leaf size of the plant type in its present growth stage, such that leaves of the plant have a strong and distinguishable effect on the radio signal. Hence, for example, also the fruit shape and/or the fruit size may be considered when selecting a radio signal for sensing a leaf volume in order to select a radio frequency where the leaves provide a distinguishable effect from the fruit.

In further embodiments, the method may comprise selecting the radio frequency in dependence of a pre-determined plant-related parameter, especially of a pre-determined value of a plant-related parameter. In particular, in such embodiment, the radio frequency may be adjusted as the plant grows in order to, for example, compensate for more and/or larger leaves (or fruits).

The radio signal may comprise a narrow-band signal and/or a broad-band signal, especially a broad-band signal. In particular, a broad-band signal may comprise multiple subcarriers, whereas a narrow-band signal comprises a single subcarrier. In embodiments, the broad-band signal may especially comprise a Wi-Fi-signal.

The method may comprise determining the plant-related parameter based on a received signal strength indicator (RSSI)-analysis of the (related) receiver signal.

In embodiments, wherein the radio signal comprises a broad-band signal, the method may comprise determining the plant-related parameter based on a channel state information analysis of the receiver signal. The combination of a broad-band signal and channel state information analysis may be particularly beneficial, as it may provide more granular and more detailed information regarding the plant-related parameter. For example, in such embodiment, it may be possible to sense the movement of a leaf, which may be indicative of a draft in the horticulture space.

In particular, as a radio signal encounters plant material, (wavelengths in the) the radio signal may be (partially) diffracted, reflected, and scattered; which may lead to an increase in the multipath signals i.e. various sub-components of the radio signal may arrive at the radio receiver at different time delays compared to a line of sight signal. Hence, next to impacting RSSI, plant material may also affect (Wi-Fi) CSI, providing opportunities for Wi-Fi CSI sensing on the leaf mass.

In further embodiments, the method may comprise beam steering, especially beam steering with a broad-band signal. The term "beam steering" may herein refer to generating multiple radiation patterns from a single (antenna of a) radio transmitter.

In further embodiments, the method may comprise using beam steering to orient the radio signal perpendicular to a (local) average leaf surface orientation. The term "local" may herein especially refer to those leaves that are arranged on the radio path. If a beam-steered radio signal (e.g. directional 60 GHz Wi-Fi), shines through the plant canopy, and is oriented parallel or at a shallow angel to the (local) average leaf surface orientation, the radio signal may be substantially scattered by the leaf edges. If the beam-steered radio signal is oriented perpendicular to the (local) average leaf surface orientation (e.g. a radio signal beam from below the plant to above the plant), the radio signal may go straight through the leaves and be scattered substantially less, especially if the leaf size is larger than the radio wavelength.

In embodiments, the method may comprise emitting a broad-band signal (especially 60 GHz Wi-Fi), especially with beam steering, to measure the stem diameter, and/or to determine water content inside the plant stem. The plant stem diameter may vary with plant stress and may thus be an indicator of plant stress and water supply.

In further embodiments, a broad-band signal, especially 60 GHz Wi-Fi, may be used to monitor leaf movements, for instance to detect unwanted air drafts within the greenhouse.

In embodiments, the radio transmitter and the radio receiver may be arranged at different heights, especially at different heights with respect to the top of the leaf canopy (of the plant), or especially at different heights with respect to a floor in the horticulture space. This may be particularly beneficial with regards to sensing plant-related parameters with regards to the plant canopy. Further, when the radio transmitter and the radio receiver are arranged at different heights, there may be less impact from surrounding radio signals, resulting in a relatively larger contribution of absorption on the measured signal.

In embodiments wherein a plurality of radio transmitter and/or radio receivers are arranged, the plurality of radio transmitter and/or radio receivers may especially be arranged at different heights. Thereby, during the sensing stage, plant-related parameters pertaining to different parts of the plant, especially different heights of the plant canopy, may be determined. For example, the method may comprise determining the average leaf mass per area for different heights within the plant canopy (e.g. top third, middle, bottom third of the plant).

In embodiments, the horticulture space may comprise a predetermined volume for plant growth. Especially, the horticulture space may have a volume selected from the range of 100 cm$^3$-100 m$^3$. If the distance between the radio transmitter and the radio receiver is too small, there may be insufficient effect of the horticulture space on the radio signal, especially, for example, if the plant is a seedling with a small canopy. Further, if the distance is too small, (an antenna of) the radio receiver may become saturated, and no variation may be measured. Similarly, however, if the distance between the radio transmitter and the radio receiver is too big, a signal/noise ratio of the radio signal may be negatively affected. Hence, in embodiments, the (shortest) distance between the radio transmitter and the radio receiver may be selected from the range of 10 cm-10 m, especially from the range of 50 cm-10 m.

In further embodiments, the distance between the radio transmitter and the radio receiver may be selected in dependence of an input parameter selected from a plant characteristic, a time-dependent parameter, and an environmental parameter.

As mentioned, the method may comprise a baseline generation stage. The baseline generation stage may comprise: (i) emitting a baseline radio signal from the radio transmitter; (ii) detecting the baseline radio signal with the radio receiver and providing a related baseline receiver signal. In such embodiments, the sensing stage may comprise determining the plant-related parameter based on the receiver signal and the baseline receiver signal.

In particular, the baseline generation stage may be temporally arranged prior to or at the start of plant growth. In further embodiments, the baseline generation stage may be executed in a plant-free horticulture space. In further embodiments, the baseline generation stage may be executed in a horticulture space hosting a seed or a seedling. For example, the baseline generation stage may be performed under substantially dry conditions of the horticulture space. For example, considering at least one plant, the dry condition of the water-related parameter may be a dry plant, or dry leaves. Moreover, the baseline generation stage may be temporally arranged prior to or at the start of a plant growth in the horticulture space.

The baseline generation stage may comprise essentially the same steps, and the same parameters, such as the same radio frequency, as the sensing stage with regards to (i) emitting a baseline radio signal from the radio transmitter; and (ii) detecting the baseline radio signal with the radio receiver and providing a related baseline receiver signal. Essentially, the baseline generation stage may be the same way of doing sensing with the difference that the baseline receiver signal is used as a reference for dynamically comparing with what is measured in subsequent sensing stages, i.e., the baseline receiver signal may be used in subsequent sensing stages as a reference to evaluate changes relative to an earlier timepoint in the growth of the plant.

In further embodiments, the method may comprise monitoring a plant in the horticulture space over time, especially wherein the monitoring comprises a plurality of temporally separated sensing stages.

In further embodiments, the sensing stages may be temporally arranged within a predetermined timeframe from executing a first plant-growth-related action, especially wherein the plant-growth-related action is selected from the group consisting of: controlling temperature (within part of the horticulture space), plant trimming, providing water, providing crop protection treatment, providing nutrition, especially fertilizer, providing light, especially a specific light spectrum, or especially a specific light intensity, exposing the plants to insects, harvesting, and providing an air flow, such as providing air conditioning, or such as opening a window to outside air. The different plant-growth-related actions may affect the interaction of the plant (or the substrate) with the radio signal, especially in different manners. In particular, the direct effect on the radio signal of a plant-growth-related action, such as providing water, may be larger than, for example, the effect of a day of growth of the plant. Hence, if the contribution of the plant-growth-related actions are not considered, a distorted view of the temporal development of the plant-related parameter may be obtained with subsequent sensing stages. Hence, in embodiments, the sensing stages may be temporally arranged relative to one or more plant-growth-related actions, which may facilitate comparing the receiver signals and/or the determined plant-related parameters over time. The term "plant-growth-related action" may also refer to a plurality of (different) plant-growth-related actions.

In further embodiments, two subsequent sensing stages may be temporally arranged such that a first of the two subsequent sensing stages is arranged (directly) prior to a plant-growth-related action, whereas the second of the two subsequent sensing stages is arranged (directly) after the plant growth-related action. Thereby, the direct effect of the plant-growth-related action on the radio signal may be determined.

In further embodiments, the baseline generation stage may be temporally arranged within a predetermined timeframe from executing a first plant-growth-related action.

In further embodiments, the method may comprise a plurality of baseline generation stages, each providing a (respective) baseline receiver signal.

For example, especially in case of the baseline generation stage being temporally arranged within a predetermined timeframe from executing a first plant-growth-related action, it may be interesting to determine a baseline before and a baseline after the plant-growth-related action. For example, when watering, the watered soil (as well as wetted leaves) may have an impact on the baseline. If one would measure again after watering and 24 hours later, the volume of the leaves may be bigger, while the humidity of the soil may be less due to water consumption. So, for the measurement 24 h after watering any observed changes may be due to water consumption and/or plant (leaf) growth. By providing baselines within predetermined timeframes from predefined actions, the effect of the action(s) performed can be measured and accounted for.

Determining (the value of) the plant-related parameter may provide insight into the state of a plant cultivation, which may be used to course correct or otherwise improve the cultivation. Hence, in embodiments, the method may comprise executing a second plant-growth-related action in dependence of the plant-related parameter, wherein the second plant-growth-related action is selected from the group consisting of: controlling temperature (within part of the horticulture space), plant trimming, providing water, providing crop protection treatment, providing nutrition, especially fertilizer, providing light, especially a specific light spectrum, or especially a specific light intensity, exposing the plants to insects, harvesting, and providing an air flow, such as providing air conditioning, or such as opening a window to outside air.

In further embodiments, the (second) plant-growth-related action may comprise controlling temperature (within part of the horticulture space), especially controlling one or more of a plant temperature, a plant leaf temperature, and a plant root temperature, or especially controlling an (average) temperature in the horticulture space. In further embodiments, the (second) plant-growth-related action may comprise plant trimming. In further embodiments, the (second) plant-growth-related action may comprise providing water. In further embodiments, the (second) plant-growth-related action may comprise providing a crop protection treatment, especially a crop protection treatment against a weed and/or a pest. In further embodiments, the (second) plant-growth-related action may comprise providing nutrition, especially fertilizer. In further embodiments, the (second) plant-growth-related action may comprise providing light, especially a specific light spectrum, such as providing light comprising one or more wavelengths selected from the range of 400-800 nm, and/or such as providing light comprising a wavelength selected for interaction with a plant phytochrome, and/or especially a specific light intensity. In further embodiments, the (second) plant-growth-related action may comprise exposing the plants to insects. In further embodiments, the (second) plant-growth-related action may comprise harvesting, especially of fruit, or especially of plant leaves. In further embodiments, the (second) plant-growth-related action may comprise providing an air flow, especially providing air conditioning, or especially providing an outside air flow.

In particular, in embodiments, the method may comprise exposing (at least part of) a plant to a second growth-related action, especially exposing (at least parts of) one or more plants of a plurality of plants to the second growth-related action.

In further embodiments, the method may comprise exposing at least part of the horticulture space to the second growth-related action, especially a subsection of the horticulture space, or especially the entire horticulture space.

Plants cultivated in a horticulture space may receive little or no natural sunlight, in particular in vertical farming arrangements. Hence, in embodiments, the method may comprise providing horticulture light to the plant, especially during a controlling mode. In further embodiments, the horticulture light may have an average intensity (on the plant) $\geq 50$ µmol/m$^2$/s, such as $\geq 100$ µmol/m$^2$/s, like even more especially $\geq 150$ µmol/m$^2$/s, such as especially selected from the range of 50-1000 µmol/m$^2$/s, even more especially selected from the range of 150-1000 µmol/m$^2$/s. In further embodiments, the horticulture light may have an average intensity selected from the range of 200-1000. In embodiments, the intensity is $\leq 800$ µmol/m$^2$/s, such as $\leq 600$ µmol/m$^2$/s, like selected from the range of 200-600 µmol/m$^2$/s, such as especially from the range of 200-525 µmol/m$^2$/s.

Especially, the indicated light intensities may be provided over a time period of 10-20 hours per day, with a dark period of 4-14 hours per day.

The conditions to which the (growing) plant is subjected may in general be defined in a recipe (see above). Hence, the method may comprise subjecting the plant to a recipe.

In embodiments, the method may comprise controlling the spectral composition of the horticulture light as function of one or more of the (value of the) plant-related parameter and a plant characteristic, especially the (value of the) plant-related parameter, or especially the plant characteristic.

In further embodiments, the method may comprise providing (supplemental) horticulture light to a plant wherein the horticulture light is provided such that a minimum level (and maximum level) of intensity of a (supplemental) wavelength range is obtained by the plant. This may herein also be indicated as "supplemental controlling mode".

In yet a further aspect, the invention also provides a computer program product comprising instructions for execution on a computer functionally coupled to a radio transmitter and a radio receiver, wherein the instructions, when executed by the computer, cause the computer to carry out the method according to the invention. Especially, the radio transmitter and the radio receiver may be arranged such that a radio path between the radio transmitter and the radio receiver passes through at least part of a horticulture space, and the radio receiver may be configured in a radio signal receiving relationship with the radio transmitter.

Therefore, the invention further provides a computer program product enabled to carry out the method as defined herein, for instance when loaded on a computer (that is functionally coupled to a horticulture system). In yet a further aspect, the invention provides a record carrier (or data carrier, such as a USB stick, a CD, DVD, etc.) storing the computer program product.

In a further aspect the invention may provide a horticulture system comprising a horticulture space, a radio transmitter, and a radio receiver. In embodiments, the radio transmitter and the radio receiver may be arranged such that a radio path between the radio transmitter and the radio receiver passes through at least part of the horticulture space. Further, the radio transmitter may be configured to emit a radio signal, wherein the radio receiver is configured for detecting the radio signal and providing a related receiver signal, especially providing a related receiver signal to a control system (see below).

In further embodiments, the horticulture system may further comprise a control system, especially wherein the control system is configured to determine a plant-related parameter or a water-related parameter based on the (related) receiver signal.

The horticulture system according to the invention may enable execution of the method of the invention, with accompanying advantages outlined above.

The term "horticulture system" may herein especially refer to a plant farm, a plant factory, a vertical farm, a city farm, a growth layer, a tray, and/or a climate cell. In embodiments, the horticulture system may comprise a climate cell. In particular, the term "horticulture system" may refer to a system configured for horticulture, and may comprise any elements commonly employed in horticulture for the cultivation of a plant.

In embodiments, the horticulture system may comprise a control system. The control system may be configured to control (part of) the horticulture system. In particular, the control system may be functionally coupled to the radio transmitter and/or the radio receiver. Especially, the control system may be configured to control the radio transmitter and/or the radio receiver.

In specific embodiments, the invention provides a horticulture system comprising a horticulture space, a control system, a radio transmitter, and a radio receiver, wherein the radio transmitter and the radio receiver are arranged such that a radio path between the radio transmitter and the radio receiver passes through at least part of the horticulture space, and wherein the radio transmitter is configured to emit a radio signal, and wherein the radio receiver is configured for detecting the radio signal and providing a related receiver signal, wherein the control system is configured to determine a plant-related parameter or a water-related parameter based on the receiver signal.

In embodiments, the horticulture system may comprise a plurality of radio transmitters. In further embodiments, the horticulture system may comprise a plurality of radio receivers. In further embodiments, The horticulture system may comprise a plurality of radio transmission pairs configured in radio signal receiving relationships, wherein each radio transmission pair comprises a (respective) radio transmitter and a (respective) radio receiver arranged such that a (respective) radio path between the (respective) radio transmitter and the (respective) radio receiver passes through at least part of the horticulture space.

In embodiments, the horticulture system may comprise a plurality of horticulture light generating devices, wherein at least part of the plurality of horticulture light generating devices comprises a (respective) radio transmitter and/or a (respective) radio receiver. In further embodiments, each of the plurality of horticulture light generating devices may comprise a (respective) radio transmitter and/or a (respective) radio receiver, especially a (respective) radio transmitter and a (respective) radio receiver. In particular, in embodiments, the horticulture system may comprise a plurality of horticulture light generating devices, a plurality of radio transmitters, and a plurality of radio receivers, wherein each of (at least part of) the plurality of horticulture light generating devices comprises a (respective) radio transmitter of the plurality of radio transmitters, and wherein each of (at least part of) the plurality of horticulture light generating devices comprises a (respective) radio receiver of the plurality of radio receivers.

In aspects, the invention may provide a horticulture system comprising a horticulture space for hosting a plant, a control system, and a plurality of radio transmission pairs, wherein the radio transmission pairs are configured in radio signal receiving relationships, and wherein each radio transmission pair comprises a radio transmitter and a radio receiver arranged such that a radio path between the radio transmitter and the radio receiver passes through at least part of the horticulture space, wherein in an operational mode the control system is configured to: select a proper sensing subset of one or more of the plurality of radio transmission pairs in dependence of an input parameter, wherein the input parameter is selected from the group consisting of a plant characteristic, a variable environmental parameter, a static environmental parameter, and the plant-related parameter; and determine the plant-related parameter based on a receiver signal of the proper sensing subset.

In an embodiment thereof, at least some of the radio transmission pairs are at least partially integrated in one or more of a horticulture light generating device, an actuator, a sensor, a smart collection container, and a horticulture robot.

Hence, as partly mentioned before, the plurality of horticulture light generating devices do not only provide a first function of providing horticulture light to the horticulture space and/or the plant, but also provide a second function of enabling RF based sensing with their integrated radio transmitter(s) and their radio receiver(s).

The plurality of horticulture light generating devices may be arranged in an array. Said array may surround the horticulture space. Said array may bound the horticulture space.

In embodiments, the horticulture system may comprise an actuator, wherein the actuator is configured to execute a plant-growth-related action, especially wherein the control system controls the actuator. In such embodiments, the horticulture system may autonomously execute a plant-growth-related action, especially in dependence of the determined (value of) the plant-related parameter or the water-related parameter.

In further embodiments, the actuator may comprise one or more of a temperature control element, a plant trimmer, a water providing element, a crop protection element, a nutrition supply element, a horticulture light generating device, an insect exposure element, a harvesting element, and a ventilation system.

In embodiments, the horticulture system may comprise a horticulture light generating device, especially wherein the horticulture light generating device comprises a light source, more especially a light source configured for providing horticulture light.

Especially, the horticulture light generating device may comprise a plurality of (different) light sources, configured for providing different wavelengths of light. In further embodiments, the horticulture light generating device may comprise a device housing, wherein the light source is arranged (at least partially) in the housing. The term "horticulture light generating device" may also refer to a plurality of (different) horticulture light generating devices.

The horticulture light generating device may especially be configured to, during operation, provide (horticulture) light to the horticulture space, more especially to a plant arranged in the horticulture space.

Lighting can play a variety of roles in horticulture, such as: (1) Supplemental lighting: Lighting that supplements the natural daylight in order to increase production (of tomatoes for example) or extend crop production during e.g. the autumn, winter, and spring period when crop prices may be higher; (2) Photoperiodic lighting: The periodic duration of light is important for many plants. The durations and the relative ratio of light and dark periods in a, for example, 24 hour cycle influences the blossoming response of many plants. Manipulating the durations and/or their ratio by means of supplemental lighting may facilitate regulating the time of blossoming; (3) Artificial lighting: Lighting for cultivation in horticulture systems independent of natural sunlight; (4) Differentiation lighting: Lighting selected to facilitate cell differentiation, for example in the context of controlling tissue formation.

The term "horticulture light" may herein especially refer to light having one more wavelengths in one or more of a first wavelength region of 400-475 nm and a second wavelength region of 625-675 nm. The relative energies (watt) that are provided in these regions may depend upon the type of plant and/or the growth phase. Hence, a recipe may define the ratio, optionally as function of time, for one or more types of plants.

The term "light source" may herein especially refer to a semiconductor light-emitting device, such as a light emitting diode (LED), a resonant cavity light emitting diode (RCLED), a vertical cavity laser diode (VCSELs), an edge emitting laser, etc. The term "light source" may also refer to an organic light-emitting diode, such as a passive-matrix (PMOLED) or an active-matrix (AMOLED).

In embodiments wherein the lighting apparatus comprises a plurality of light sources, two or more subsets of the plurality of light sources may be independently controllable, especially by the control system. Yet further, two or more of the subsets may provide light with different spectral distributions and/or different intensities. In such embodiments, intensity and spectral distribution of the horticulture light may be controllable, especially by the control system. Hence, the two or more subsets may, in embodiments, be configured to provide light with different spectral distributions.

Further, in specific embodiments, the horticulture light generating device may be configured to provide the horticulture light with an average intensity selected from the range of at least 50 µmol/m²/s, such as especially at least 100 µmol/m²/s at a distance from the horticulture light generating device of at least 30 cm, such as at least 100 cm. Especially, the horticulture light generating device may be configured to provide the horticulture light with the average intensity at a distance of at least 30 cm from the lighting apparatus. Further, the lighting apparatus may be configured to provide the horticulture light with the average intensity during a predefined time period (e.g., hours per day).

Hence, in embodiments, the control system may be configured to adjust the spectral distribution and/or the intensity of the light provided by the horticulture light generating device, especially by the plurality of light sources, in dependence of the plant-related parameter or the water-related parameter.

In embodiments, the horticulture system may comprise (at least part of) a horticulture arrangement. The horticulture arrangement may especially be configured for hosting a plant. Especially, the horticulture arrangement may comprise a horticulture growth support to support the plant. Hence, in embodiments, during operation the plant may be arranged in a horticulture arrangement. Especially, the term "horticulture arrangement" may refer to structure for hosting the plant, especially wherein the plant is grown under controlled conditions, more especially wherein the plant essentially does not receive natural sunlight. Further, the horticulture arrangement may be climatized, such as in the case of a climate cell.

In further embodiments, a climate cell may comprise the horticulture growth support and the horticulture light generating device, and the control system may be configured inside or external from the climate cell.

The horticulture system may be configured for growing food in multiple layers, thereby making much better use of the available space as compared to outdoor growth or growth in greenhouses. This implies that natural sunlight will not be able to reach all plants in the horticulture system and a substantial proportion of the light may need to come from artificial lighting. Hence, the invention especially refers to horticulture systems wherein the plants substantially, especially essentially only, receive artificial light.

In use, the horticulture arrangement may include a horticulture growth support with a plant, or a horticulture growth support with a seed, or a horticulture growth support with a seedling, etc. The term "horticulture growth support" may herein especially refer to a plant pot, tray, wires etc., which can be used to grow a plant in, on, or along.

In use, the horticulture arrangement may comprise a substrate, especially a substrate with a plant, or especially a substrate with a seed, or especially a substrate with a seedling. The terms "substrate" may herein especially refer to one or more of (particulate) substrate, aqueous substrate (in hydroponics), soil, rockwool, etc., which can be used to grow plants in, on, or along, etc.

In embodiments, the horticulture system may comprise a sensor, especially a sensor comprising one or more of a camera, an infrared sensor, a multi-spectral sensor, a humidity sensor, a VOC sensor, a motion sensor, an asset tracking sensor, a light sensor, a dust sensor, a temperature sensor, a gas sensor, a vibration sensor, tilt sensor, a nitrogen sensor, and a water leakage sensor. The radio transmitter and/or the radio receiver may be integrated in said sensor, or such sensors.

In embodiments, the sensor may be configured to sense an input parameter, especially an input parameter selected from a plant characteristic, a time-dependent parameter, and an environmental parameter. Thereby, the sensor may provide (a value of) an input parameter for the radio transmitter and/or the radio receiver. The sensor may especially be configured to operate complementary to the radio transmitter and the radio receiver.

In further embodiments, the sensor may be configured to sense a parameter, especially a (second) plant-related parameter selected from the group comprising a nutrient, a leaf size, a plant temperature, a plant leaf temperature, a plant root temperature, a plant stem length, a plant fruit size, etc., or especially a (second) environmental parameter selected from the group comprising a temperature, a humidity, a gas composition (in the horticulture system, especially in the horticulture arrangement), and a natural sunlight intensity (would also natural sunlight be applied). In further embodiments, the sensor may comprise a camera, such as a CCD camera. The term "sensor" may also refer to a plurality of sensors. Especially the horticulture system, especially the horticulture arrangement, may include a plurality of (spatially separated) (light) sensors.

In further embodiments, the sensor may be configured for sensing one or more of: (i) number and/or appearance and/or color of leaves of the plant, (ii) area and/or color of a canopy of the plant, and (iii) number and/or appearance of flowers of the plant.

In embodiments, the sensor may be configured to monitor a plant-related parameter, and to provide a related sensor signal (to the control system), especially wherein the control system is configured to control the horticulture system in dependence of the sensor signal. In particular, the control system may control the spectral distribution and/or intensity of the horticulture light in dependence of the sensor signal.

In further embodiments, the sensor may comprise a light sensor configured to sense ambient light, and to provide a related light sensor signal (to the control system), especially wherein the control system may be configured to (have the lighting apparatus) provide the horticulture light (and/or) supplemental light based on the light sensor signal.

Hence, the control system may, in embodiments, be configured to control the horticulture system in dependence of the (related) receiver signal and the sensor signal.

The conditions to which the (growing) plant is subjected may in general be defined in a recipe. Hence, the control system may be configured to, during operation, subject the plant to a recipe. The recipe may include a light recipe, which may define a predetermined horticulture light intensity. This may imply that the recipe defines a predetermined horticulture light intensity over time. Alternatively or additionally, the recipe may define a predetermined horticulture light intensity as function of a parameter, especially a plant-related parameter. In further embodiments, the parameter may comprise an environmental parameter selected from the group comprising a temperature, a humidity, a gas composition (in the horticulture system, especially in the horticulture arrangement), and a natural sunlight intensity (would also natural sunlight be applied). A recipe directed to lighting parameters may be indicated as "light recipe". A light recipe may be comprised by a recipe that also include other parameters, such as an imposed temperature, especially at a plant part, such as at a plant leaf, or such as at a plant root.

In embodiments, the control system may be configured to control the spectral composition of the horticulture light as function of one or more of (i) number and/or appearance and/or color of leaves of the plant, (ii) area and/or color of a canopy of the plant, and (iii) number and/or appearance of flowers of the plant.

In embodiments, the control system may be configured to control the horticulture arrangement. Especially, the control system may be configured to control one or more of temperature, humidity, irrigation, nutrient supply, light intensity of the horticulture light, air conditions including one or more of air temperature, air composition, air flow, etc. of the horticulture arrangement. The control system may be configured to control one or more of these conditions at different locations in the arrangement.

In embodiments, the control system may be configured to control the sensor.

In embodiments, the control system may be configured to control the actuator.

In embodiments, the control system may be configured to (have the horticulture system) execute the method of the invention.

The controlling of the element can be done with a control system, which may also be indicated as "controller". The control system and the element may thus at least temporarily, or permanently, functionally be coupled. The element may comprise the control system. In embodiments, the control system and element may not be physically coupled. Control can be done via wired and/or wireless control. The term "control system" may also refer to a plurality of different control systems, which especially are functionally coupled, and of which e.g. one control system may be a master control system and one or more others may be slave control systems. A control system may comprise or may be functionally coupled to a user interface.

Examples of user interface devices include a manually actuated button, a display, a touch screen, a keypad, a voice activated input device, an audio output, an indicator (e.g., lights), a switch, a knob, a modem, and a networking card, among others.

For explanatory purposes, the invention may herein primarily be described in the context of embodiments in relation to the sensing of a plant leaf volume. It will be clear to the person skilled in the art that the invention is not limited to such embodiments.

The embodiments described herein are not limited to a single aspect of the invention. For example, an embodiment describing the plant-related parameters in relation to the method may, for example, further relate to the horticulture system. Similarly, an embodiment of the system describing the horticulture light may further apply to the method. Embodiments related to the method may especially further relate to the operation of the horticulture system and vice versa. In particular, an embodiment of the method describing an operation of (part of) the horticulture system may indicate that (the part of) the horticulture system may, in embodiments, be configured for and/or be suitable for the operation.

There is an unmet need to reliably assess growth of horticulture plants in a noninvasive way. More specifically, it is desired to continuously monitor cultivation conditions in cultivation media of horticulture plants, for example the soil-root zones of horticulture plants. Such monitoring may render valuable data for e.g. yield, efficiency, and health analysis & forecasting.

Hence, in further aspects, the invention may provide, in various paragraphs a horticulture system.

Paragraph 1: The invention may provide a horticulture system for monitoring a cultivation condition in a cultivation medium, wherein the horticulture system comprises: a substrate arranged for holding the cultivation medium; a transmitter device configured to transmit a radiofrequency signal through at least part of the cultivation medium; a receiver device configured to receive said radiofrequency signal; a control device configured to determine a quality of the cultivation condition based on comparing the received radiofrequency signal to a predetermined baseline radiofrequency signal that is indicative of a baseline quality of said cultivation condition.

The invention provides the benefit that the cultivation condition in the cultivation medium is determined via a radiofrequency (or: radio) signal. More specifically, a quality (or: value) of the cultivation condition is determined via radiofrequency-based sensing. As a radiofrequency signal interacts with said cultivation condition in said cultivation medium, the radiofrequency signal may be affected, such as partially absorbed, diffracted, scattered and/or reflected, by the cultivation condition in the cultivation medium. The cultivation condition may for example be a root structure and/or a water content in the cultivation medium. Hence, by transmitting (or: providing) a radiofrequency signal from the transmitter device (or: e.g. a radio transmitter) to the receiver device (or: e.g. a radio receiver) through at least part of the cultivation medium, observations may be made with respect to a cultivation condition in a cultivation medium (of a plant arranged in a horticulture space) based on changes in the radiofrequency signal.

Thus, even though prior art may consider the interaction between a cultivation condition and a radio signal undesirable; because such a cultivation condition may interfere with radio communication, and may cause blockage and scattering of radio signals, and/or reflection and partial adsorption. Here, however, the interaction is taken advantage of to provide improved sensing of a quality of the cultivation condition.

In particular, the invention may relate to sensing with radiofrequency (RF) to analyze variations in wireless signal strength and/or wireless multipath propagation, especially compared to baselines. Hence, RF sensing measurements may be taken for recording a predetermined baseline radiofrequency signal that is indicative of a baseline quality of said cultivation condition. For example, such a predetermined baseline radiofrequency signal may relate to a cultivation medium without any cultivation condition present, such as e.g. natural soil without any roots of a plant, or only present at a baseline quality of said cultivation condition, such as e.g. natural soil with merely a seed of a plant. The same may apply to monitoring a cultivation condition related to water content, irrigation and/or humidity, wherein the predetermined baseline radiofrequency signal may be taken at dry conditions, i.e. e.g. the quality of said cultivation condition is characterized by being a dry baseline condition. Furthermore, said predetermined baseline radiofrequency signal may alternatively be taken during a further growth phase of a plant. Comparing the actual received radiofrequency signal to such a predetermined baseline radiofrequency signal may render comparisons between growth phases of a plant. Alternatively, instead of comparing to earlier recorded baselines, the monitoring of the cultivation condition may involve comparing measurements of various RF plant-sensing detection zones(taken at the same time) with each other and flag a plant zone with abnormal cultivation conditions compared to other plant zones.

Hence, the present invention provides a horticulture system to monitor a cultivation condition via radiofrequency-based sensing, such as for example a root growth of a plant, a soil property, and/or an irrigation uniformity. The increasing wirelessly connected devices within the horticulture domain may advantageously be leveraged and adapted as the transmitter device and the receiver device. The present invention thereby enables continuous measurements within a horticulture growing facility, allowing to (simultaneously) monitor a larger quantity of plants, rather than just a few measurements in controlled lab conditions and/or at a single plant location in a horticultural facility. The present invention is thus clearly advantageous and overcomes or ameliorate at least one of the disadvantages of the prior art.

Paragraph 2: The control device may be configured to determine the quality of the cultivation condition based on comparing a RSSI of the received radiofrequency signal to a RSSI of the predetermined baseline radiofrequency signal.

Paragraph 3: The transmitter device and/or the receiver device may be one of: a lighting device, a switch, a sensor device, an actuator device, a camera, a climate control device, a router, a bridge, a computing device, a user interface device.

Paragraph 4: The transmitter device may be a first lighting device and/or the receiver device is a second lighting device.

Paragraph 5: The transmitter device may be arranged in a first plane, wherein the receiver device is arranged in a second plane, wherein the first plane is substantially parallel to the second plane, wherein the cultivation medium is arranged in between the first plane and the second plane.

Paragraph 6: The cultivation medium may comprise at least one of: natural soil, rockwool, peat moss, saw dust, sand, clay, hybrid soils, a hydroponic medium, a nutrient solution, perlite, gravel, rice husks, coconut husks.

Paragraph 7: The cultivation condition may comprise at least one of: plant root size, plant root architecture, water content, irrigation non-uniformity, hybrid soil density.

Paragraph 8: The radiofrequency signal comprises a frequency of at least 60 GHz. Paragraph 9: The control device is comprised by the receiver device. Paragraph 10: the substrate comprises the receiver device. Paragraph 11: The control device is configured to output an output signal indicative of the determined quality of the cultivation condition, and/or to output a control signal for controlling an electrical device based on said determined quality of the cultivation condition.

The advantages and/or embodiments applying to the method and horticulture system according to the initial aspect of the invention may also apply mutatis mutandis to the horticulture system according to said paragraphs 1-11 of the invention.

BRIEF DESCRIPTION OF THE DRAWINGS

Embodiments will now be described, by way of example only, with reference to the accompanying schematic drawings in which corresponding reference symbols indicate corresponding parts, and in which:

FIG. 10 schematically depicts an embodiment of the method of the invention.

DETAILED DESCRIPTION OF THE EMBODIMENTS

Figure 1:
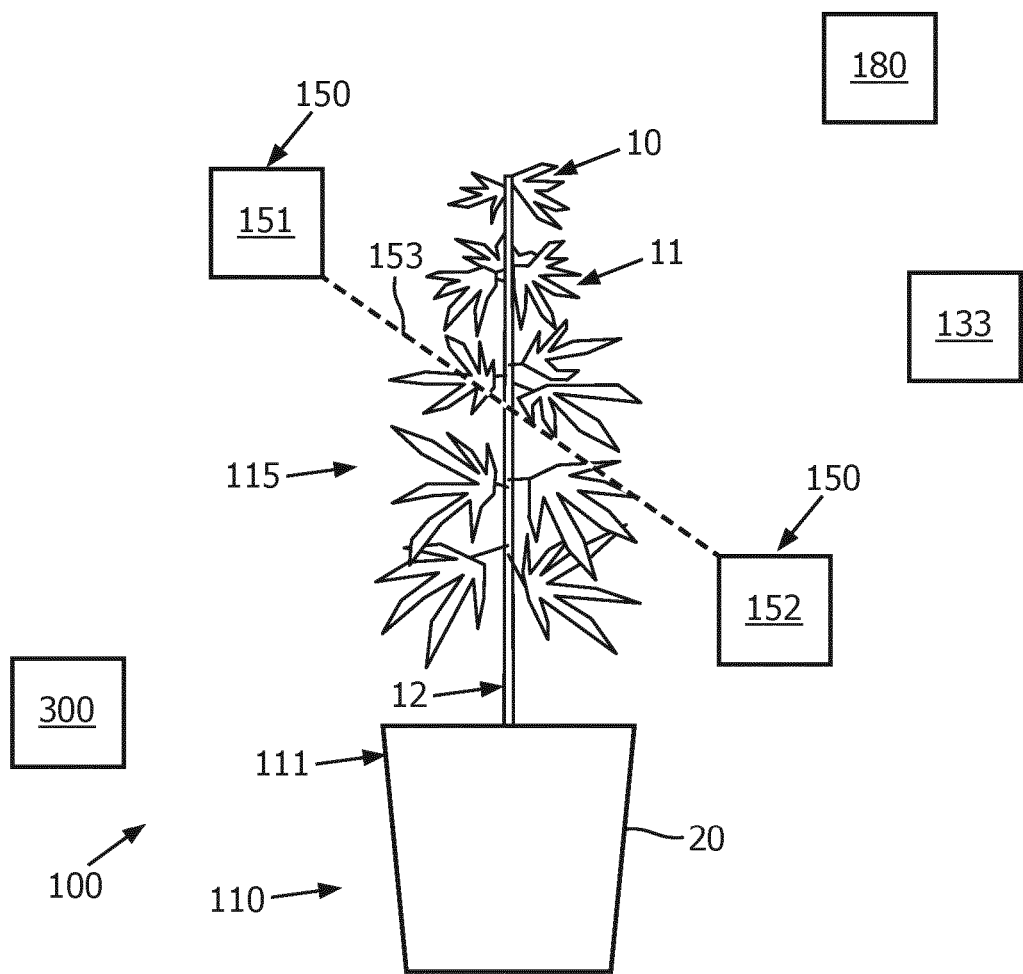
FIG. 1 schematically depicts an embodiment of the method of the invention.

FIG. 1 schematically depicts an embodiment of the method for sensing a plant-related parameter in a horticulture space 115, wherein a radio transmitter 151 and a radio receiver 152 are arranged such that a radio path 153 between the radio transmitter 151 and the radio receiver 152 passes through at least part of the horticulture space 115. Further, in embodiments, the radio receiver 152 may be configured in a radio signal receiving relationship with the radio transmitter 151. In embodiments, the method may comprise a sensing stage. The sensing stage may comprise (i) emitting a radio signal with the radio transmitter 151; (ii) detecting the radio signal with the radio receiver 152 and providing a related receiver signal; and (iii) determining the plant-related parameter based on the receiver signal.

In the depicted embodiment, the radio path 153 passes through a plant 10 arranged in the horticulture space 115. Specifically, the radio path 153 may pass through a plant canopy 11 of the plant 10, or may pass through a plant stem 12 off the plant 10. As the radio signal travels through the plant 10, the radio signal may interact with the plant (part) and be altered thereby. Hence, once the radio signal arrives at the radio receiver 152, the radio signal may have been altered relative to the radio signal as sent from the radio transmitter 151, which may be informative regarding a plant-related parameter pertaining to the plant 10, especially pertaining to the plant part.

Alternatively, the plant related parameter may be a water-related parameter, wherein the water related parameter is an amount of water condensation. Said amount of water condensation may be present at the leaves and/or canopy of the plant. As the radio signal travels through the plant, the radio signal may interact with the water condensation at the leaves and/or canopy and be altered thereby.

In embodiments, the plant-related parameter may comprise a plant volumetric parameter selected from the group comprising a leaf volume, a stem volume, a root volume, a fruit volume, a seed volume, and a nut volume.

In the depicted embodiment, the horticulture space 115 comprises a substrate 20, especially a substrate arranged in a horticulture growth support 111. In further embodiments, the radio path may pass through at least part of the substrate 20, and the plant-related parameter may especially comprise a substrate-related parameter selected from the group comprising a substrate humidity level, a substrate salinity level, a substrate humidity uniformity, substrate density, substrate thickness, foreign objects in the substrate, and a substrate nutrient parameter.

In the depicted embodiment, the radio transmitter 151 and the radio receiver 152 are arranged at different heights.

In embodiments, the method may comprise a baseline generation stage. The baseline generation stage may comprise: emitting a baseline radio signal from the radio transmitter 151; and detecting the baseline radio signal with the radio receiver 152 and providing a related baseline receiver signal. In such embodiments, the sensing stage may comprise determining the plant-related parameter based on the receiver signal and the baseline receiver signal. For example, in relation to the depicted embodiment, the baseline generation stage could have been executed when the plant was absent, or when it was still a seed or seedling, in order to provide a reference baseline signal to compare the receiver signal to for determining the plant-related parameter, such as a plant part volume. As an alternative example, the baseline generation stage may be temporally arranged prior to executing a plant-growth-related action, wherein the sensing stage is temporally arranged after execution of the plant-growth-related action in order to determine the effect of the plant-growth-related action.

In further embodiments, the method may comprises monitoring a plant 10 in the horticulture space 115 over time, wherein the monitoring comprises a plurality of temporally separated sensing stages, wherein the sensing stages are temporally arranged within a predetermined timeframe from executing a (first) plant-growth-related action, wherein the (first) plant-growth-related action is selected from the group consisting of: controlling temperature (within part of the horticulture space), plant trimming, providing water, providing nutrition, especially providing fertilizer, providing light, especially providing horticulture light, exposing the plants to insects, harvesting, and providing an air flow.

In further embodiments, the method may comprise executing a (second) plant-growth-related action in dependence of the plant-related parameter.

FIG. 1 further schematically depicts an embodiments of a horticulture system 100 comprising a horticulture space 115, a control system 300, a radio transmitter 151, and a radio receiver 152. The radio transmitter 151 and the radio receiver 152 are arranged such that a radio path 153 between the radio transmitter 151 and the radio receiver 152 passes through at least part of the horticulture space 115. Especially, the radio transmitter 151 may be configured to emit a radio signal, and the radio receiver 152 may be configured for detecting the radio signal and providing a related receiver signal, especially providing the related receiver signal to the control system. The control system 300 may be configured to determine a plant-related parameter based on the receiver signal.

In embodiments, the horticulture system 100 may comprises an actuator 133, wherein the actuator 133 is configured to execute a plant-growth-related action, wherein the control system 300 controls the actuator 133.

In embodiments, the horticulture system 100 may comprise (at least part of) a horticulture arrangement 110. The horticulture arrangement may especially be configured for hosting a plant 10. Especially, the horticulture arrangement 110 may comprise a horticulture growth support 111 to support the plant 10. In the depicted embodiment, the horticulture growth support 111 comprises a pot. In further embodiments, the horticulture growth support 111 may, for example, comprise a tray or a (grid of) wires (for climbing plants). Especially, the horticulture arrangement 110, especially the horticulture growth support 111, may comprise a substrate 20 for supporting the plant 10, such as for, amongst others, providing nutrition to the plant 10.

In embodiments, the horticulture system 100 may comprise a sensor 180, especially a sensor 180 comprising one or more of a camera, an infrared sensor, a multi-spectral sensor, a humidity sensor, a VOC sensor, a motion sensor, an asset tracking sensor, a light sensor, a dust sensor, a temperature sensor, a gas sensor, a vibration sensor, tilt sensor, a nitrogen sensor, and a water leakage sensor. In further embodiments, the sensor 180 may be configured to sense an input parameter, especially an input parameter selected from a plant characteristic, a time-dependent parameter, and an environmental parameter. Thereby, the sensor 180 may provide (a value of) an input parameter for the radio transmitter 151 and/or the radio receiver 152. The sensor 180 may especially be configured to operate complementary to the radio transmitter 151 and the radio receiver 152.

Figure 2:
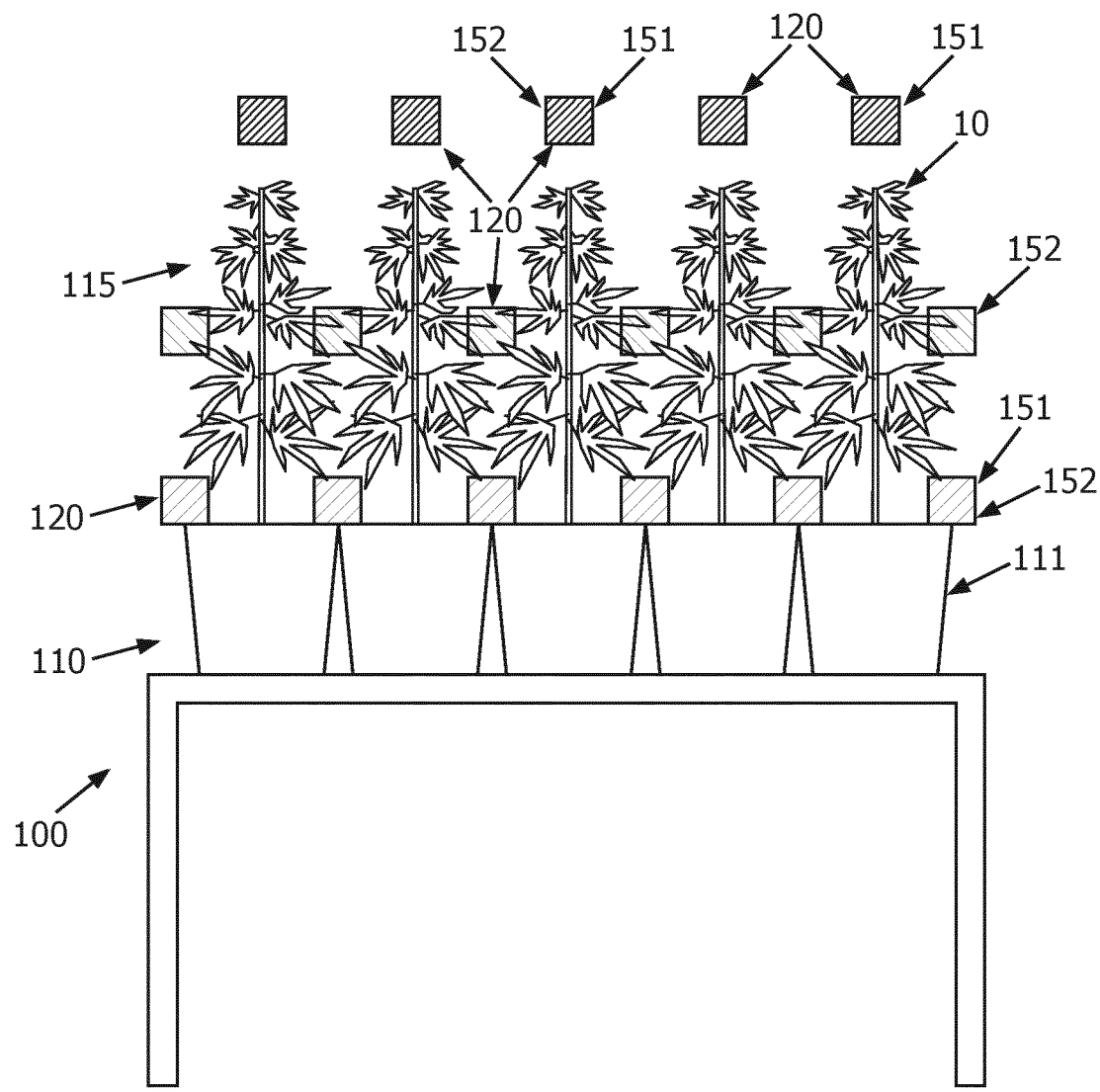
FIG. 2 schematically depicts an embodiment of the method of the invention.

FIG. 2 schematically depicts an embodiment of the method, wherein a plurality of radio transmitters 151 and a plurality of radio receivers 152 are arranged in and/or around the horticulture space 115. In such embodiments, the sensing stage may comprise sequentially emitting radio signals from radio transmitters 151 of the plurality of radio transmitters 151; and detecting the sequentially emitted radio signals with one or more radio receivers 152 and providing the related receiver signal.

In the depicted embodiment, the plant 10 comprises a plurality of same plants. In further embodiments, the plant 10 may also comprise a plurality of different plants. Generally, however, the plant 10 may comprise a plurality of same plants.

FIG. 2 further depicts an embodiment of the horticulture system 100 comprising a horticulture light generating device 120, especially wherein the horticulture light generating device 120 comprises a light source, more especially a light source configured for providing horticulture light. Especially, the horticulture light generating device may comprise a plurality of (different) light sources, configured for providing different wavelengths of light.

The horticulture light generating device 120 may be arranged to provide (horticulture) light to the horticulture space 115, especially, during operation, to the plant 10. In the depicted embodiment, the horticulture system 100 comprises a plurality of horticulture light generating devices 120 arranged to provide, during operation, (horticulture) light from different sides of the plant 10, especially by arranging the horticulture light generating devices 120 at different heights. For example, as in the depicted embodiment, part of the horticulture light generating devices 120 may be arranged for top illumination, part for side illumination, and part for bottom illumination.

In embodiments, the radio transmitter 151 may be comprised by (or integrated in) a (first) horticulture light generating device 120. In further embodiments, the radio receiver 152 may be comprised by (or integrated in) a (second) horticulture light generating device 120.

Especially, in further embodiments, the horticulture system 100 may comprise a plurality of horticulture light generating devices 120, wherein each horticulture light generating device 120 comprises a radio transmitter 151 and/or a radio receiver 152, especially wherein each horticulture light generating device 120 comprises a radio transmitter 151 and a radio receiver 152, i.e., the horticulture system 100 may comprise a plurality of horticulture light generating devices 120, a plurality of radio transmitters and a plurality of radio receivers, wherein each horticulture light generating device comprises at least one radio transmitter (of the plurality of radio transmitters) and/or at least one radio receiver (of the plurality of radio receivers).

Figure 3:
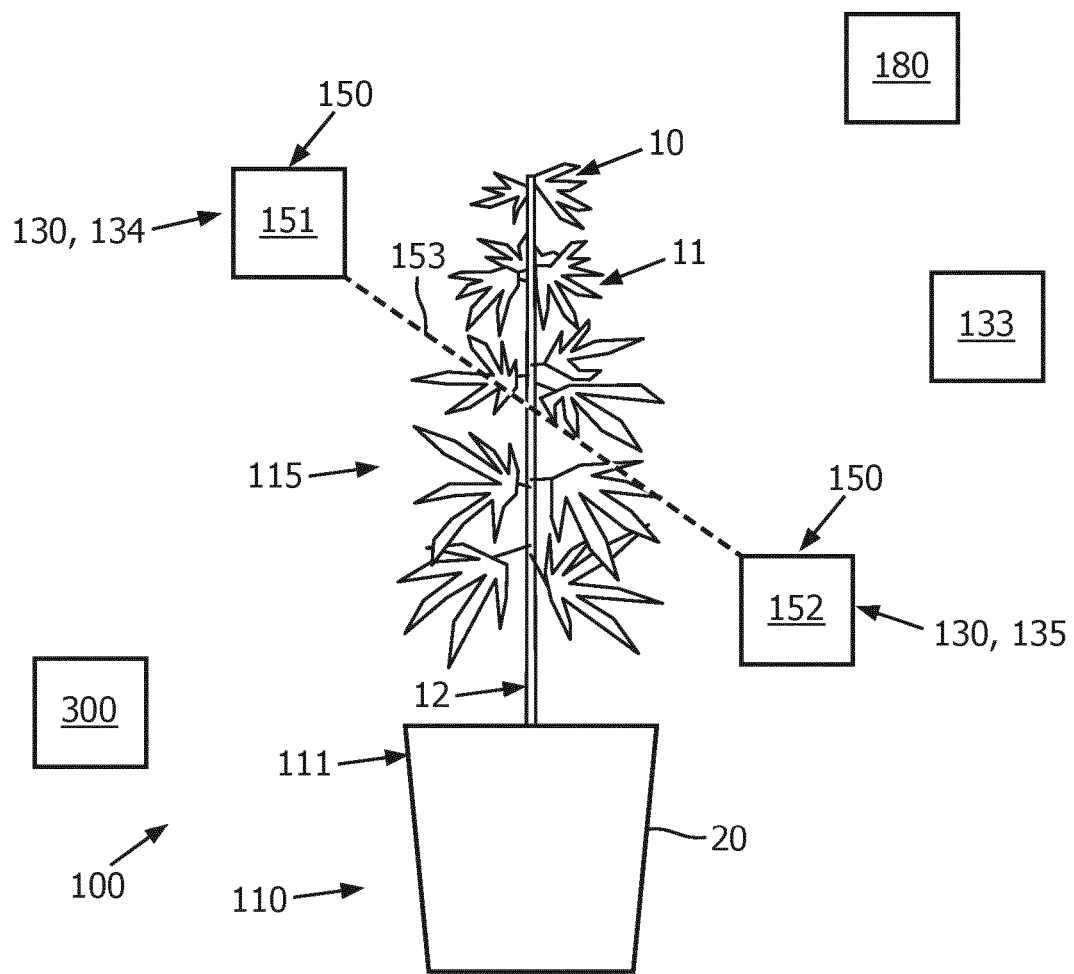
FIG. 3 schematically depicts an embodiment of the method of the invention.

FIG. 3 schematically depicts an embodiment of the method for sensing a plant-related parameter in a horticulture space 115, wherein a radio transmitter 151 and a radio receiver 152 are arranged such that a radio path 153 between the radio transmitter 151 and the radio receiver 152 passes through at least part of the horticulture space 115. Further, in embodiments, the radio receiver 152 may be configured in a radio signal receiving relationship with the radio transmitter 151. In embodiments, the method may comprise a sensing stage. The sensing stage may comprise (i) emitting a radio signal with the radio transmitter 151; (ii) detecting the radio signal with the radio receiver 152 and providing a related receiver signal; and (iii) determining the plant-related parameter based on the receiver signal.

In the depicted embodiment, the radio transmitter 151 is comprised by a (first) horticulture device 130, and the radio receiver 152 is comprised by a (second) horticulture device 130. In particular, in the depicted embodiment, the radio transmitter in comprised by a temperature control element 134, and the radio receiver is comprised by a horticulture light control element 135. Said term 'comprised by' may be phrased as 'integrated in'. In further embodiments, the first (or second) horticulture device may comprise one or more of a horticulture light generating device 120, a horticulture light control element 135, especially a wall switch or occupancy sensor, an actuator 133, especially a horticulture tray actuator, a sensor 180, a horticulture temperature control element 134, a horticulture robot, a bridge device, etc. In further embodiments, the horticulture device may comprise a horticulture light generating device. In further embodiments, for example, the radio receiver may be comprised by (or integrated in) the actuator 133 or by the sensor 180.

Similar to the above, considering a similar setting, the invention may be described by a plurality of the mentioned hardware components in the FIGS. 1-3.

Namely: FIG. 10 schematically depicts a method for sensing a plant-related parameter in a horticulture space 115 for hosting a plant 10 (for visualization purposes not depicted here), wherein a plurality of radio transmission pairs 150, 150a, 150b, 150c, 150d, 150e, 150f are configured in radio signal receiving relationships. In the depicted embodiment, each radio transmission pair 150 comprises a (respective) radio transmitter 151 and a (respective) radio receiver 152 arranged such that a radio path 153 between the radio transmitter 151 and the radio receiver 152 passes through at least part of the horticulture space 115. In particular, in the depicted embodiment, the radio transmitters 151 and radio receivers 152 are arranged in a cuboid shape surrounding at least part of the horticulture space 115, particularly wherein the radio transmitters 151 and radio receivers 152 are arranged at the corners of the cuboid shape. In the depicted embodiment, for visualization purposes, the radio transmitters 151 (and radio receivers 152) are depicted at a part of the corners of the cuboid shape. In further embodiments, the radio transmitters 151 and/or radio receivers may be arranged at each corner of the cuboid shape. Further, for visualization purposes only, FIG. 10 depicts multiple representations of the same embodiment wherein different radio transmission pairs 150, 150a, 150b, 150c, 150d, 150e, 150f and corresponding radio paths 153, 153a, 153b, 153c, 153d, 153e, 153f are depicted. The radio transmission pairs 150 may overlap in radio transmitter or radio receiver. For example, radio transmission pairs 150a and 150b are depicted to share a radio receiver 152, whereas radio transmission pairs 150b, 150e, and 150f are depicted to share a radio transmitter 151.

In embodiments, the method may comprise a selection stage comprising selecting a proper sensing subset 160 of the plurality of radio transmission pairs 150 in dependence of an input parameter selected from the group consisting of a plant characteristic, a variable environmental parameter, a static environmental parameter and the plant-related parameter.

In embodiments, the selection stage may comprise selecting the proper sensing subset 160 based on height differences within the radio transmission pairs, wherein the proper sensing subset 160 comprises at least one radio transmission pair 150 of which the radio transmitter 151 and the radio receiver 152 are arranged at different heights. In FIG. 10, a proper sensing subset 160 is depicted, for visualization purposes, by indicating the corresponding radio paths 153, wherein the radio transmitter 151 and the radio receiver 152 of radio transmission pair 150f—corresponding to radio path 153f—are arranged at different heights, especially at different heights relative to the plant canopy 11. Further, in the depicted embodiment, the radio receiver 152 of radio transmission pair 150f is also comprised by another radio transmission pair 150 selected in the proper sensing subset 160.

In general, if two radio transmission pairs 150 have essentially the same radio path 153, e.g., when the locations of the radio transmitter 151 and the radio receiver 152 are essentially reversed, such as for the radio communication pairs 150b and 150c, the two radio transmission pairs 150 may provide essentially the same signal. Hence, in general, the radio transmission pairs of the proper sensing subset may (be selected to) each comprise a distinct radio path.

In further embodiments, for example, in the selection stage a proper sensing subset 160 consisting of radio transmission pairs 150a, 150d, and 150f could be selected.

In further embodiments, the method may comprise a sensing stage comprising determining the plant-related parameter based on a receiver signal of the proper sensing subset 160.

FIG. 10 further schematically depicts a vertical radio communication pair 150, 150c arranged at a distance dc, especially a distance dc along the (shortest) radio path 153, 153c of the radio communication pair 150, 150c. Similarly, FIG. 10 further schematically depicts a diagonal radio communication pair 150, 150e arranged at a distance de, especially a distance de along the (shortest) radio path 153, 153e of the radio communication pair 150, 150e. The distances dc and de may especially be individually selected from the range of 0.5 m-10 m.

Figure 11:
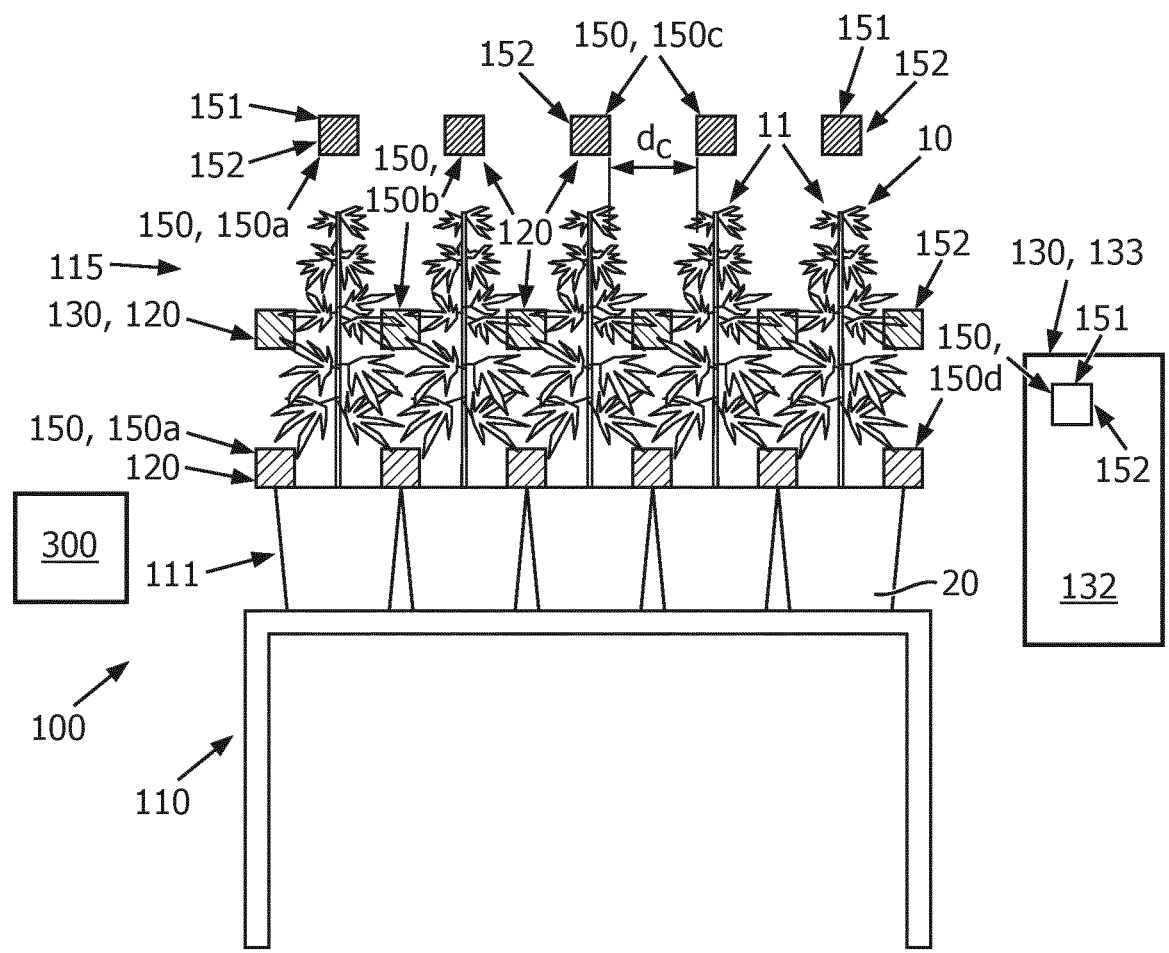
FIGS. 11-12 schematically depict embodiments of the method of the invention.
Figure 12:
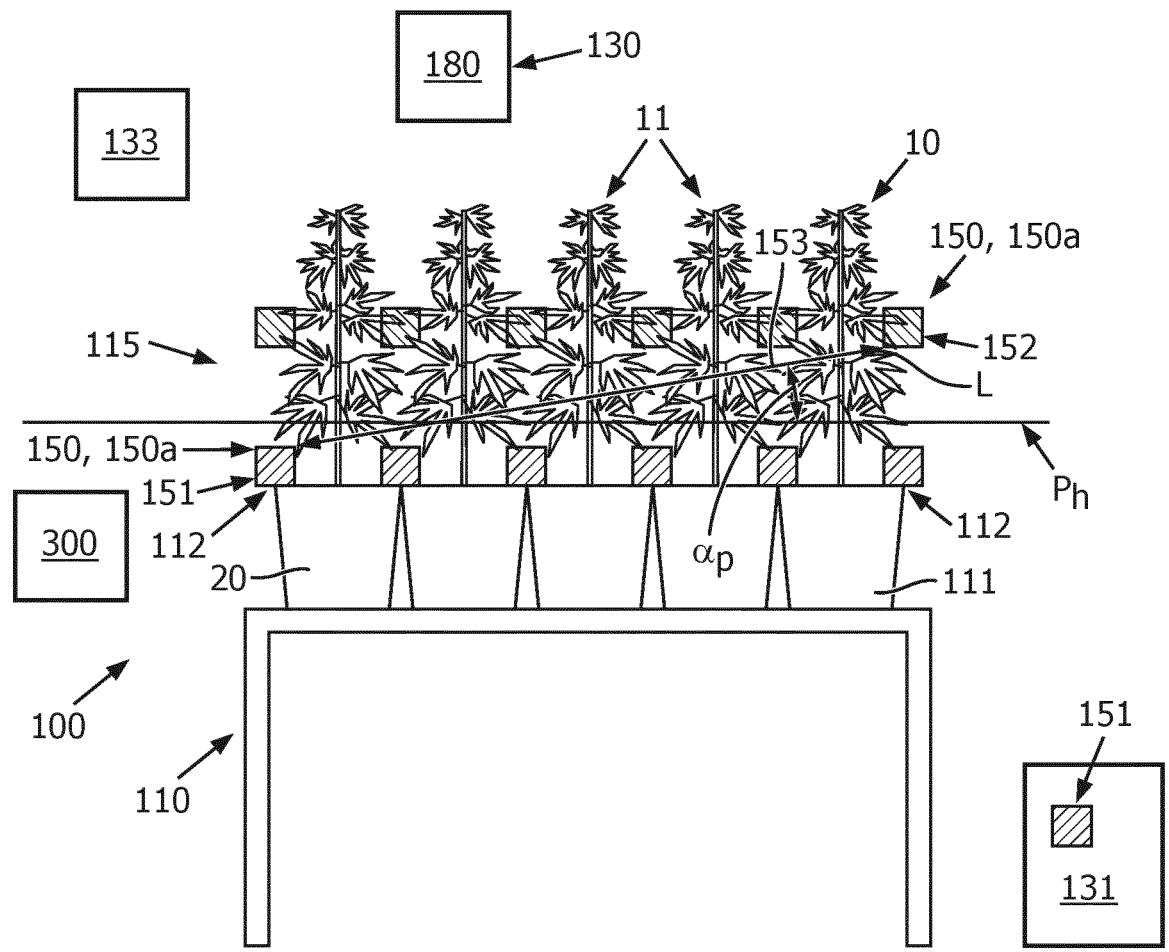

FIG. 11 and FIG. 12 schematically depict embodiments of the method for sensing a plant-related parameter in a horticulture space 115 for hosting a plant 10, wherein a plurality of radio transmission pairs 150 are configured in radio signal receiving relationships. In the depicted embodiments, each radio transmission pair 150, 150a, 150b, 150c comprises a radio transmitter 151 and a radio receiver 152 arranged such that a radio path 153 between the radio transmitter 151 and the radio receiver 152 passes through at least part of the horticulture space 115. The method may comprise a selection stage and a sensing stage. The selection stage may comprise selecting a proper sensing subset 160 of the plurality of radio transmission pairs 150 in dependence of an input parameter selected from the group consisting of a plant characteristic, a variable environmental parameter, a static environmental parameter and the plant-related parameter. The sensing stage may comprise determining the plant-related parameter based on a receiver signal of the proper sensing subset 160.

In embodiments, the selection stage may comprise comparing signal quality indicators of one or more of the plurality of radio transmission pairs 150 in a moist leaves condition and in a dry leaves condition to determine a leaf moisture effect, and to select the proper sensing subset 160 based on the leaf moisture effect.

In the depicted embodiments, the horticulture space 115 comprises a horticulture growth support 111, wherein the selection stage comprises selecting the proper sensing subset 160 based on boundaries of the horticulture growth support 111 or a structural obstacle, especially based on boundaries of the horticulture growth support. In particular, the proper sensing subset 160 may comprise at least one radio transmission pair 150 of which in a projection on a horizontal plane both the radio transmitter 151 and the radio receiver 152 are arranged at a distance selected from the range of 10 cm-2 m relative to a boundary of the horticulture growth support 111, especially arranged at corners 112 of the growth support. In the depicted embodiment, the horticulture growth support comprises a pot. In further embodiments, the horticulture growth support may, for example, comprise a tray.

In the depicted embodiments, (at least part of) the radio transmitters 151 and (at least part of) the radio receivers 152 are comprised by horticulture devices 130. In particular, the horticulture devices may comprise devices selected from the group comprising a horticulture light device, especially a horticulture light generating device 120, a horticulture light control element, especially a wall switch or occupancy sensor, an actuator 133, especially a horticulture tray actuator, or especially a climate control actuator, a sensor 180, especially a climate control sensor, a horticulture temperature control element, a smart collection container 131, and a horticulture robot 132. The term "smart collection container" may herein especially refer to a container for harvest.

In further embodiments, (at least part of) the radio transmitters 151 and (at least part of) the radio receivers 152 may be comprised by horticulture light generating devices 120, wherein the horticulture light generating devices 120 are configured to provide horticulture light to the plant 10.

In the embodiment depicted in FIG. 12, the selection stage comprises selecting the proper sensing subset 160 based on radio transmission pair arrangement, wherein the proper sensing subset 160 comprises at least one radio transmission pair 150 of which the radio transmitter 151 and the radio receiver 152 are arranged on a line L, wherein the line L has an angle αP to a horizontal plane Ph. In particular, in the depicted embodiment, the angle αP—is a shallow angle, especially an angle selected from the range of 5°-30°. For a radio signal travelling along a shallow angle, the plant leaves may be a particularly dominant contributor to attenuation of the radio signal. Such an arrangement may thus be particularly suitable for leaf measurements.

In further embodiments, the angle αP—may be selected from the range of 60°-85°. For a radio signal travelling along such a near-vertical angle, the plant stem/plant trunk may be a particularly dominant contributor to attenuation of the radio signal. Such an arrangement may thus be particularly suitable for stem/trunk measurements.

FIG. 11 and FIG. 12 further schematically depict a horticulture system 100 comprising a horticulture space 115 for hosting a plant 10. The horticulture system 100 further comprises a control system 300, and a plurality of radio transmission pairs 150, 150a, 150b, 150c, 150d. The radio transmission pairs 150, 150a, 150b, 150c, 150d are configured in radio signal receiving relationships. Especially, each radio transmission pair 150 may comprise a radio transmitter 151 and a radio receiver 152 arranged such that a radio path 153 between the radio transmitter 151 and the radio receiver 152 passes through at least part of the horticulture space 115. In embodiments, in an operational mode the control system 300 may be configured to select a proper sensing subset 160 of one or more of the plurality of radio transmission pairs 150 in dependence of an input parameter, especially wherein the input parameter is selected from the group consisting of a plant characteristic, a variable environmental parameter, a static environmental parameter, and the plant-related parameter. In further embodiments, in the operational mode, the control system 300 may be configured to determine the plant-related parameter based on a receiver signal of the proper sensing subset 160.

In embodiments, at least some of the radio transmission pairs 150, especially at least part of the radio transmitters 151, and/or especially at least part of the radio receivers 152, are at least partially integrated in horticulture devices 130, especially in horticulture devices 130 selected from the group comprising a horticulture light device, especially a horticulture light generating device 120, a horticulture light control element, especially a wall switch or occupancy sensor, an actuator 133, especially a horticulture tray actuator, or especially a climate control actuator, a sensor 180, especially a climate control sensor, a horticulture temperature control element, a smart collection container 131, and a horticulture robot 132. The term "smart collection container" may herein especially refer to a container for harvest.

In further embodiments, the horticulture system 100 may comprise a plurality of horticulture light generating devices 120, wherein (at least part of) the radio transmitters 151 and (at least part of) the radio receivers 152 are comprised by horticulture light generating devices 120, wherein the horticulture light generating devices 120 are configured to provide horticulture light to the plant 10.

In depicted embodiments, the horticulture system 100 comprises an actuator 133, especially an actuator selected from the group comprising a temperature control element, a plant trimmer, a water providing element, nutrition supply element, a lighting element, an insect exposure element, and a harvesting element. In further embodiments, the control system 300 may be configured to control the actuator 133.

Experiment 1A:

The method of the invention has been evaluated in an experimental setup with 8 radios (or "nodes") utilizing ZigBee communication. Each of the 8 radios comprised a radio transmitter and a radio receiver. The 8 radios were arranged at corners of a cuboid space surrounding a plant or a plurality of plants, wherein four radios were arranged at a wall, i.e., one side of the cuboid space borders a wall. Each radio transmitter could be brought in a radio communication receiving relationship with each radio receiver of one of the other 7 radios. Hence, in total, 56 radio communication pairs were available.

Figure 4:
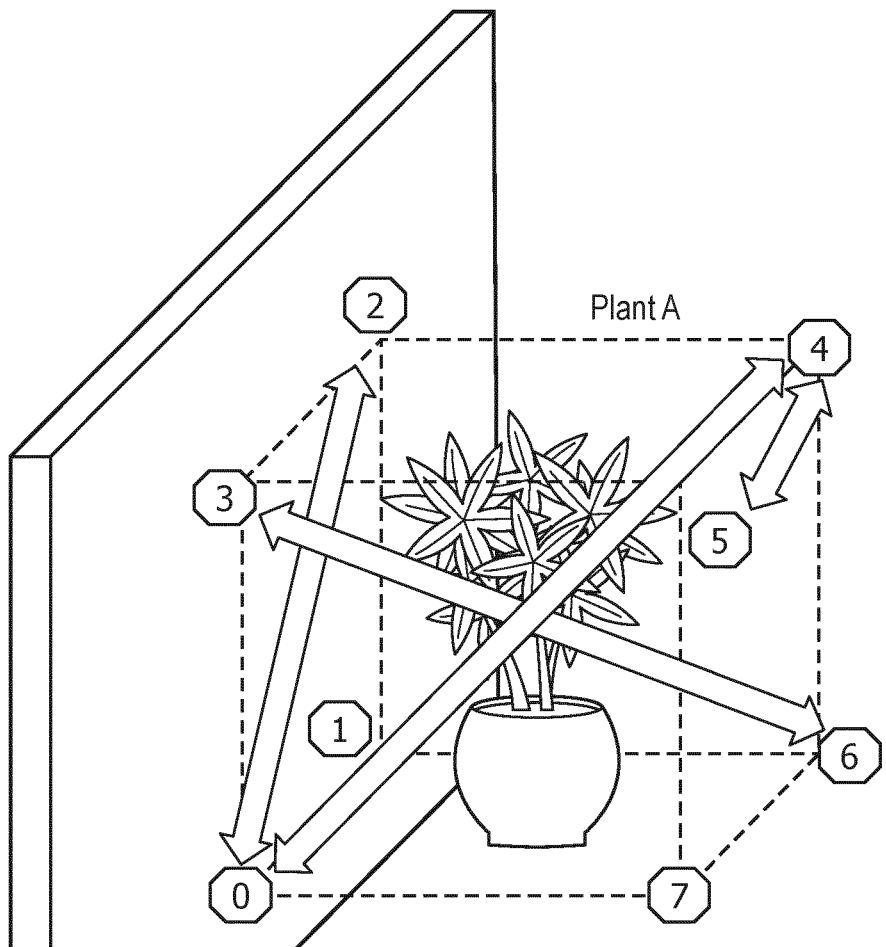
FIG. 4 schematically depicts an experimental setup associated with the invention.

Reference is thereby made to FIG. 4, which schematically represents the experimental setup, and more specific represents the numbering and positioning of said radios spanning said cuboid space.

In a first test—with the plant having dry leaves—RSSI signals of the 8 radios were collected for about 5 minutes. As mentioned, the radios use standard ZigBee communication. In a second test, water was sprayed on the leaves to represent freshly-water-misted plants in a greenhouse, and the RSSI was again determined for 5 minutes. The experiment assessed two different type of plants (plant A & plant B); first an RF sensing measurement of plant A was performed, then a measurement of plant B, and lastly a measurement with both plants A+B together.

FIG. 4 visualizes part of the experimental results. The arrows highlight the RF sensing node-links, which experience the high delta values in RSSI due to the presence of the plant compared to a "no-plant" baseline condition. The darkest arrow shows the node link with the strongest delta in RSSI value. Plants A and B have the same pot, but are different plants. The plant species of plant A in the experiment is *Yucca elephantipes*, but alternatively, other plants may be envisioned and the present invention is not limited thereto. The plant species of plant B is *Ficus cyathistipula*, but alternatively, other plants may be envisioned and the present invention is not limited thereto. The leaves and canopy of plant A and plant B are thus different. The measurements clearly demonstrate that plants A and B show a different RF sensing fingerprint, and can therefore be distinguished.

Figure 7:
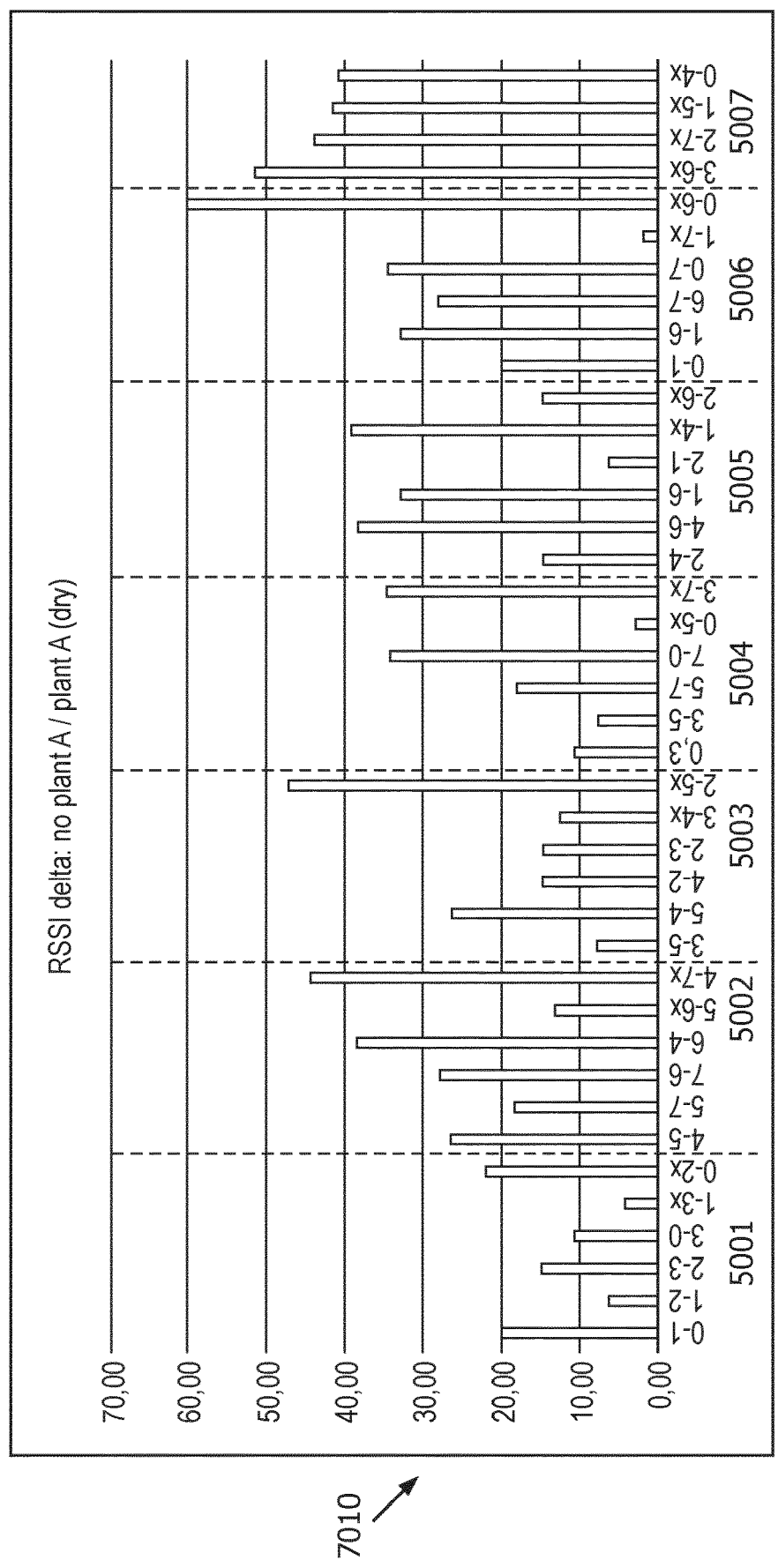
FIG. 7 schematically depicts results of an experimental setup associated with the invention.

FIG. 7 depicts schematically, in a graph, the results of the first test. Graph 7010 depicts the RSSI delta value in percentage (%) of the situation 'no plant A' versus 'Plant A dry'. Graph 7020 depicts the RSSI delta value in percentage (%) of the situation 'no plant A+B' versus 'Plant A+B dry'. Such tests may be considered a baseline test. It is concluded from the experiment with No-plant-present vs Plant that wireless links 7-6 (bottom-edge), 4-5 (top) and 0-4 (cross) are dominant and can preferably be selected at least for monitoring this type of plant. With additional RF sensing links, the 3D nature of the plant will be even better captured. While in principle it is desired that all available RF links are used for RF sensing, as each of them tells something, in a practical wireless network it is required to make choices which nodes send RF sensing messages in order to honor the bandwidth constraints of the wireless network. Hence, a subset of the available links may advantageously be selected, while still performing the function of RF sensing accurately.

Hence, these experiments show that out of theoretically available 28 links, three of the links (cross 0-4, bottom-edge 7-6, top 4-5) show a strongest strong response when a plant is added, hence these three links are excellent candidates for RF sensing pairs. The first representative link (node 0-node 4) is selected to capture a center-shot through the plant; the second representative link (node 4-5) is selected to grazing shot parallel to the top of the canopy. the third representative link (7-6) is selected to capture a grazing along the bottom side of the plant. In combination, all three shorts links represent the three-dimensional structure of the plant and outer plant surface.

Experiment 1B:

The experiments further demonstrated that the effect of dry versus moist leaves was measurable with RF sensing, both in the setups with single plants and in the setup with both plants combined. After spraying the plants with water, the RSSI signals between all pairs of lights were impacted. In particular, some pairs showed more pronounced changes, while others showed only minor changes. The changes in RSSI signals were either positive (higher dBm) or negative (lower dBm). Specifically, for each setup, the following maximal deltas (or "differences") were observed:

Plant A: max delta of 2.25 dBm (5.56%), i.e. on node-link n3-n6 as shown in FIG. 4.

Plant B: max delta of 5.6 dBm (11.16%), i.e. on node-link n2-n3 as shown in FIG. 4.

Plant A+B: max delta of 5.1 dBm (9.7%), i.e. on node-link n1-n3 as shown in FIG. 4.

Further, these deltas were observed with different radio communication pairs. For plant A, the largest delta was observed with a radio transmitter and a radio receiver at opposite corners of the cube. For plant B, the largest delta was observed with a radio transmitter and radio receiver both arranged at the wall and at the top side of the cube. For the combination of plants A+B, the largest delta was observed with the radio transmitter both arranged at the wall, wherein the radio transmitter and the radio receiver were arranged at opposite corners of the side of the cuboid shape facing the wall.

Results of said experiment, and second test dry-versus-wet, are shown in the tables below. The tables correspond to the information depicted in FIG. 4.

PLANT A

| Node-Link | RSSI (dBm) Dry | RSSI (dBm) Wet | Absolute Delta | % |
|---|---|---|---|---|
| n3-n6 | −40.44 | −42.69 | 2.25 | 5.56 |
| n0-n2 | −44.29 | −43.19 | 1.1 | 2.48 |
| n0-n4 | −44.73 | −43.05 | 1.68 | 3.76 |
| n4-n5 | −37.8 | −36.66 | 1.14 | 3.02 |

PLANT B

| Node-Link | RSSI (dBm) Dry | RSSI (dBm) Wet | Absolute Delta | % |
|---|---|---|---|---|
| n2-n3 | −50.19 | −55.79 | 5.6 | 11.16 |
| n0-n3 | −42.29 | −38.04 | 4.25 | 10.05 |
| n0-n4 | −45.59 | −42.81 | 2.78 | 6.10 |
| n2-n6 | −45.92 | −43.28 | 2.64 | 5.75 |

PLANT A + B

| Node-Link | RSSI (dBm) Dry | RSSI (dBm) Wet | Absolute Delta | % |
|---|---|---|---|---|
| n1-n3 | −52.6 | −57.66 | 5.1 | 9.7 |
| n0-n6 | −53.1 | −49.92 | 3.18 | 5.99 |
| n0-n4 | −65.1 | −61.58 | 3.55 | 5.45 |
| n6-n7 | −52.2 | −49.53 | 2.68 | 5.13 |

Figure 5:
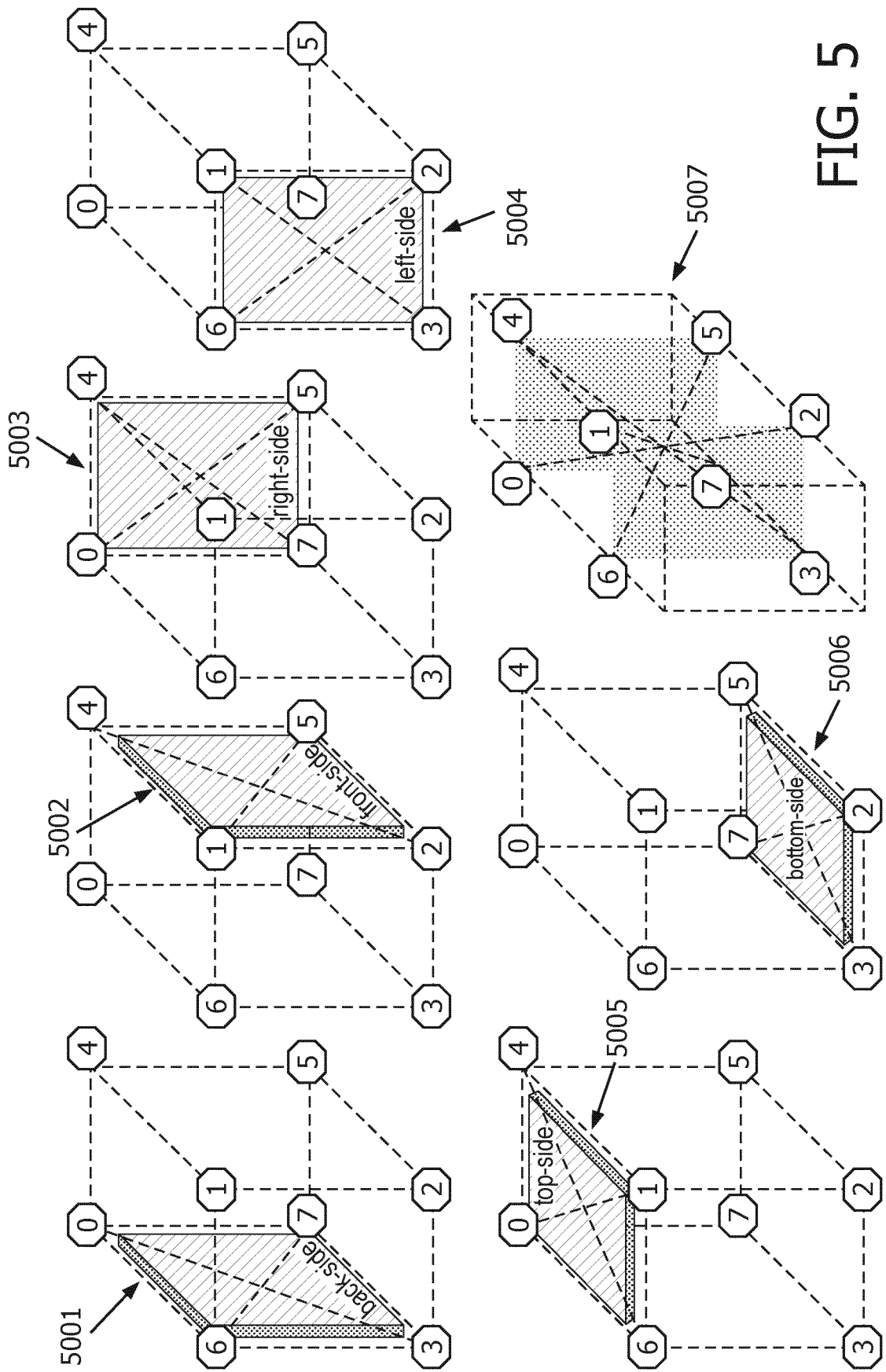
FIG. 5 schematically depicts information on an experimental setup associated with the invention.
Figure 6:
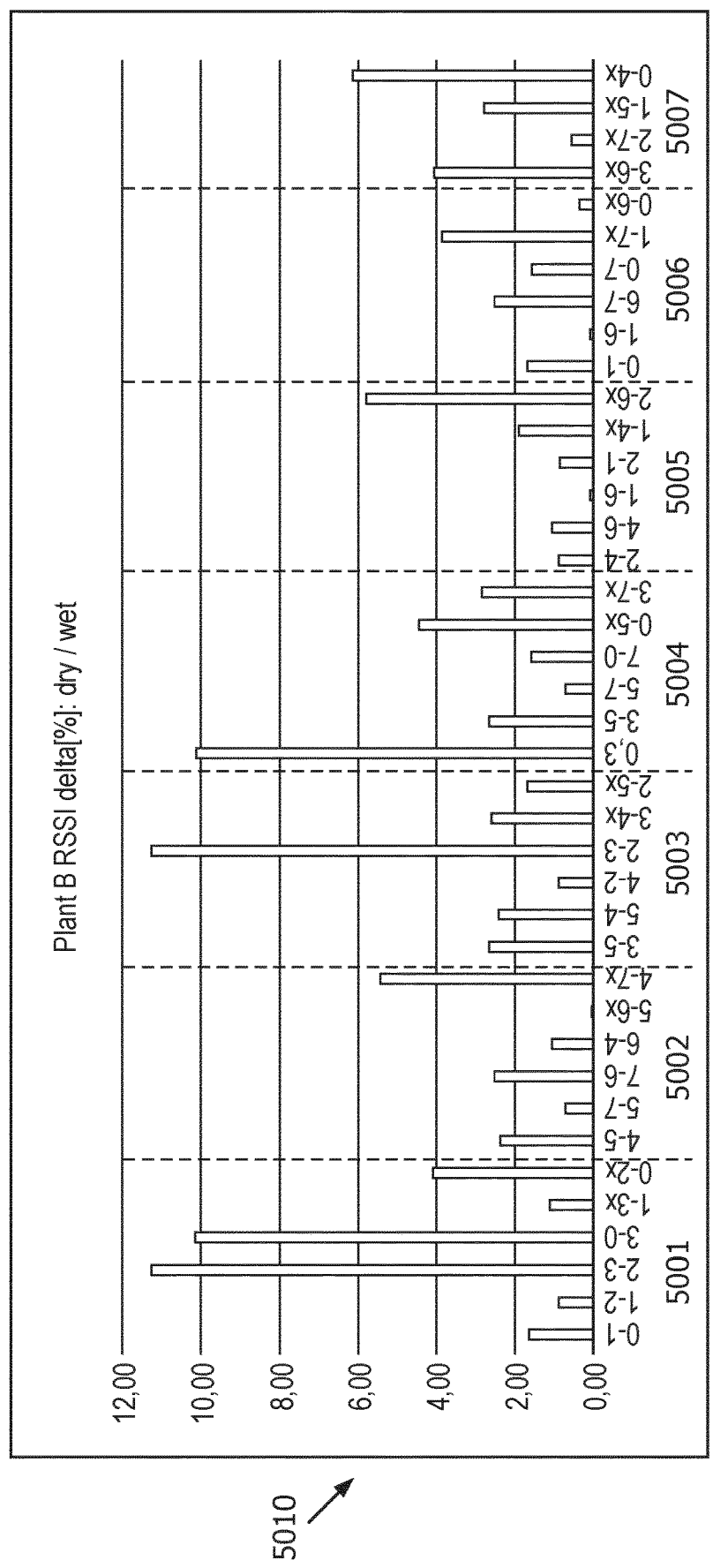
FIG. 6 schematically depicts results of an experimental setup associated with the invention.

As mentioned, the 8 radios were arranged at corners of a cuboid space surrounding a plant or a plurality of plants. FIG. 5 depicts schematically the planes that are used to facilitate the visualization of the experimental results in more detail. Plane 5001 is the back side. Plane 5002 is the front side. Plane 5003 is the right side. Plane 5004 is the left side. Plane 5005 is the top side. Plane 5006 is the bottom side. Plane 5007 indicates diagonal crosslinks. FIG. 6 depicts the delta in RSSI value for each node pair associated with said planes 5001, 5002, 5003, 5004, 5005, 5006, 5007 for the above experiment for plant A, B, A+B with dry versus wet leaves.

Hence, the experimental results in the above tables, FIG. 4 and FIG. 6 demonstrate that the moistening the leaves results for various RF sensing links in a clear delta signal on the RSSI. The data also shows that depending on the plant type (plant type A vs plant type B), different luminaire links responds strongest to the change, which may indicate that the plant shape and plant outline play an important role.

The wetting of the leaves of the plants can be identified by monitoring only the most dominant link. Alternatively, another option is to aggregate the RSSI delta of all the nodes. By applying the aggregated option, the above measurements result for Plant A in a 61% delta, for Plant B in a 118% delta and for Plant A&B in a 109% change. Hence, an indication of the wetting of a plant may swiftly be recognized.

Real-time condensation monitoring in the greenhouse allows growers to push the boundaries without risking plant yield loss due to dangerous moisture buildup or dew point condensation. As the developing microclimates are closely monitored with RF sensing, as prosed in the present invention, growers can place plants closer.

The present experiments may thereby be advantageous for farming. For example, vertical farming of leafy crops such as lettuce or medical *cannabis*, currently start making use of AI to monitor the plants integral leaf surface. This requires complicated algorithms and computational power. The present application proposes to use RF sensing to continuously monitor wireless transmission parameters between nodes of a wireless network, for example the wireless horticulture growth lights or other wireless sensors/controllers, so as to deduce amongst others insights about the current total leaf surface area and hence future plant yield.

Experiment 2:

As mentioned, the present invention relates to sensing a plant-related parameter of a plant in a horticulture space. Said plant-related parameter may be roots of a plant. The horticulture space may be a pot. Therefore, a baseline radio signal may be determined of a first pot filled with growing media but without plants/roots in the growing media. The growing media, or cultuvation medium, may e.g. be Rockwool or soil. By comparing this baseline measurement with a second pot housing a plant (and associated roots), the RF sensing contributions of the growing media can be isolated, e.g. the RF sensing contributions of the roots. As Rockwool can after soaking with nutrient solution be quickly drained on demand for a RF sensing measurement sequence, Rockwool is especially well suited for RF sensing of the root-structure.

Hence, experiments have been performed to pick up root-matter within a horticulture cultivation medium, or growing medium, with RF sensing. The experimental setup is similar to example 1A/1B described above, and is performed with 8 radios (or "nodes") utilizing ZigBee communication. Each of the 8 radios comprised a radio transmitter and a radio receiver. The 8 radios were arranged at corners of a cuboid space surrounding a plant or a plurality of plants. More specifically, the 8 nodes were commissioned to form a ZigBee a RF sensing network, with the 8 nodes taking turns to broadcast Zigbee packets around in the network, which are received by all its peer nodes. The receiving node derive from the ZigBee message the RSSI data. A RF sensing network of 8 nodes has 28 possible node-links (see FIG. 5). The resulting rectangular RF sensing box has 6 sides, and each side has several RF node-links. Some of these links go diagonal across the surface, while others are tracing the edges of the rectangular sensing box.

Figure 8:
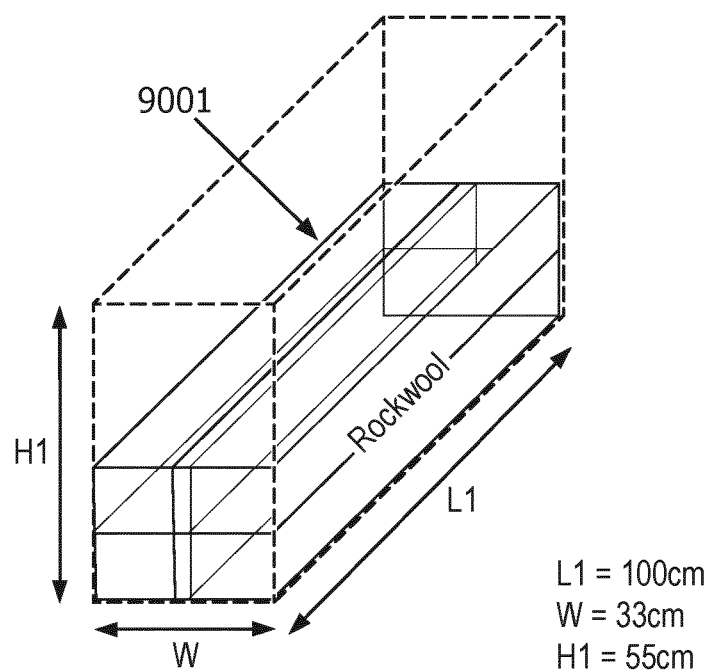
FIG. 8 schematically depicts an experimental setup associated with the invention.
Figure 8:
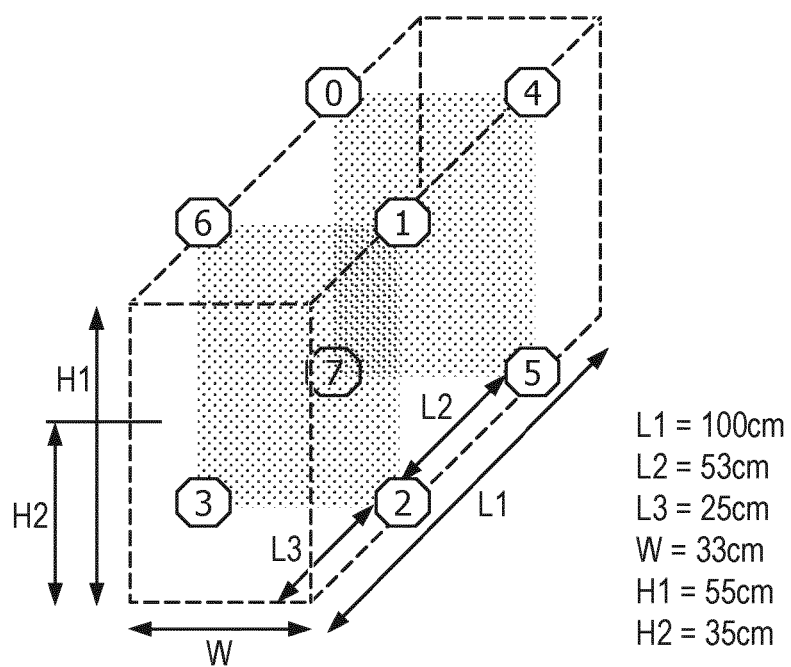

The experiments are performed, by non-limiting example, with the *Daucus carota* "Flakkeese" carrots placed in a box of rockwool growing medium. A similar set-up as radio nodes is used as described for example 1 above. The carrots are a root vegetable and generically representative to plant root mass. The RF sensing experiment consists of 4 standard rockwool growth medium slabs, with 8 RF sensing nodes placed on a cardboard box. This is schematically represented in FIG. 8. The rockwool is indicated with reference 9001. Again, FIG. 5 depicts schematically the planes that are used to facilitate the visualization of the experimental results in more detail.

During the experiments, data from all links is collected and analyzed. The first experiment consisted of 3 measurements: (i) Measurement 1: Determine the RSSI of all RF node links with rockwool present but no plant roots. (ii) Measurement 2: Determine the RSSI of all RF node links with the roots added within the rockwool growing media; in the present experiment, as mentioned, carrots represent the root of a horticulture plant growing in Rockwool. (iii) Measurement 3: Determine the RSSI of RF node links with the roots AND the rockwool AND irrigated with water. Every testing phase was conducted for at least 30 minutes.

Figure 9:
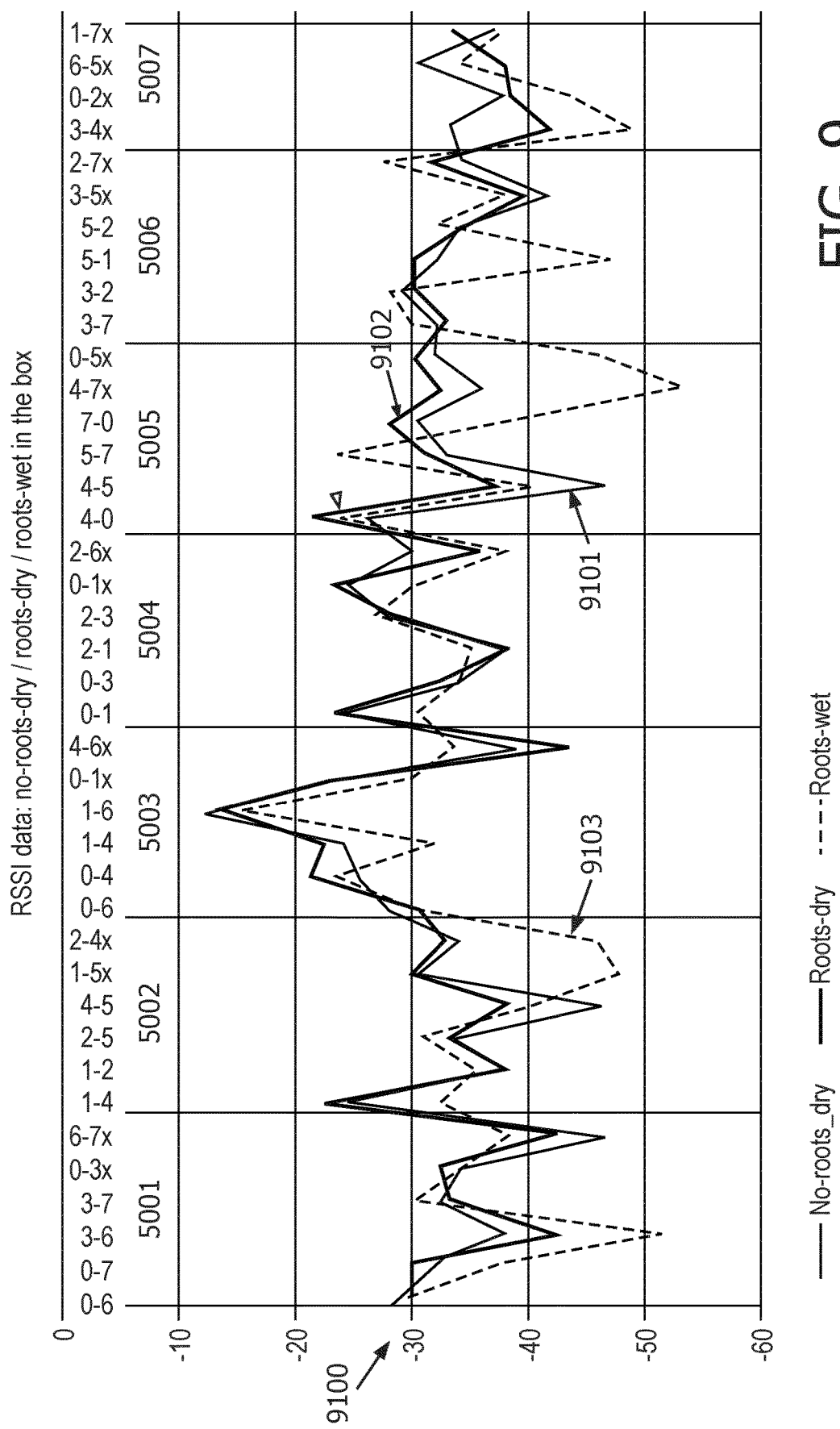
FIG. 9 schematically depicts results of an experimental setup associated with the invention.

The results of these three (i), (ii), (iii) experiments are shown in FIG. 9. This figure shows the graph 9100: "Raw RSSI data in dBm for Dry Rockwool with No-Roots (reference 9101), Dry-Rockwool with Roots (reference 9102), and Wet-Rockwool growing medium with Roots (reference 9103). The graph 9100 also contains identification of the respective surface orientation of the RF sensing box, referenced with 5001,5002,5003, 5004, 5005, 5006, 5007. FIG. 10 also shows the graph 9200: "Delta in RSSI [%] for each node link compared to a baseline of an empty & dry rockwool box with no roots". Graph 9200 thereby shows this comparison for the case referenced with 9201 of rockwool wet and the case referenced with 9202 rockwool dry.

Considering the results depicted in FIG. 9, both the presence of the root as well as the wetting of the growing medium with water result in a strong signal. It may be concluded from our measurements that adding the roots within the rockwool growing media can be easily detected on almost all the RF sensing node-links. Most prominent links are:

- 4-5 From bottom of the box to top, straight through the rockwool.
- 3-4× Cross link in the box from left bottom to right top, straight through the rockwool.
- 6-5× Cross link in the box from left top to right bottom, straight through the rockwool.

Moreover, pouring irrigation water into the box and wetting the rockwool has a big impact om the RSSI delta compared to the non-irrigated baseline. Hence, it is possible to monitor the uniformity of horticulture drip irrigation with RF sensing. Many node-links show sufficient RSSI delta. Namely:

- 1-5×: Cross link at front side of the box, not going through rockwool.
- 4-7×: Cross link at right side of the box, going through the rockwool.
- 0-5×: Cross link at right side of the box, going through the rockwool.

Moreover, when considering that said radio nodes may be integrated in luminaires, the best choice of luminaires for detection of roots in the rockwool are the diagonal cross-links going through the box from left-top to right-bottom or left-bottom to right-top. The best choice for assessing the irrigation condition of the soil-less growing medium (rockwool) are the node cross links going directly from top to bottom.

The term "plurality" refers to two or more. Furthermore, the terms "a plurality of" and "a number of" may be used interchangeably.

The terms "substantially" or "essentially" herein, and similar terms, will be understood by the person skilled in the art. The terms "substantially" or "essentially" may also include embodiments with "entirely", "completely", "all", etc. Hence, in embodiments the adjective substantially or essentially may also be removed. Where applicable, the term "substantially" or the term "essentially" may also relate to 90% or higher, such as 95% or higher, especially 99% or higher, even more especially 99.5% or higher, including 100%. Moreover, the terms "about" and "approximately" may also relate to 90% or higher, such as 95% or higher, especially 99% or higher, even more especially 99.5% or higher, including 100%. For numerical values it is to be understood that the terms "substantially", "essentially", "about", and "approximately" may also relate to the range of 90%-110%, such as 95%-105%, especially 99%-101% of the values(s) it refers to.

The term "comprise" includes also embodiments wherein the term "comprises" means "consists of".

The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices, apparatus, or systems may herein amongst others be described during operation. As will be clear to the person skilled in the art, the invention is not limited to methods of operation, or devices, apparatus, or systems in operation.

The term "further embodiment" and similar terms may refer to an embodiment comprising the features of the previously discussed embodiment, but may also refer to an alternative embodiment.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim.

Use of the verb "to comprise" and its conjugations does not exclude the presence of elements or steps other than those stated in a claim. Unless the context clearly requires otherwise, throughout the description and the claims, the words "comprise", "comprising", "include", "including", "contain", "containing" and the like are to be construed in an inclusive sense as opposed to an exclusive or exhaustive sense; that is to say, in the sense of "including, but not limited to".

The article "a" or "an" preceding an element does not exclude the presence of a plurality of such elements.

The invention may be implemented by means of hardware comprising several distinct elements, and by means of a suitably programmed computer. In a device claim, or an apparatus claim, or a system claim, enumerating several means, several of these means may be embodied by one and the same item of hardware. The mere fact that certain measures are recited in mutually different dependent claims does not indicate that a combination of these measures cannot be used to advantage.

The invention also provides a control system that may control the device, apparatus, or system, or that may execute the herein described method or process. Yet further, the invention also provides a computer program product, when running on a computer which is functionally coupled to or comprised by the device, apparatus, or system, controls one or more controllable elements of such device, apparatus, or system.

The invention further applies to a device, apparatus, or system comprising one or more of the characterizing features described in the description and/or shown in the attached drawings. The invention further pertains to a method or process comprising one or more of the characterizing features described in the description and/or shown in the attached drawings. Moreover, if a method or an embodiment of the method is described being executed in a device, apparatus, or system, it will be understood that the device, apparatus, or system is suitable for or configured for (executing) the method or the embodiment of the method respectively.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

The invention claimed is:

1. A method for sensing a plant-related parameter of a plant in horticulture space, wherein (i) a plurality of radio transmitters and a plurality of radio receivers are arranged such that a radio path is formed between each of the plurality or radio transmitters and a corresponding one of the plurality of radio receivers such that each radio path passes through at least part of the horticulture space, and (ii) the corresponding one of the plurality of radio receivers is configured in a radio signal receiving relationship with each of the plurality of radio transmitters, the method comprising:
emitting a baseline radio signal from each of the plurality of radio transmitters that passes through the plant during a baseline generation stage;
detecting the baseline radio signal with the corresponding one of the plurality of radio receivers and providing a related baseline receiver signal during the baseline generation stage;
sequentially emitting a radio signal with each of the plurality of radio transmitters that passes through the plant during a sensing stage;
sequentially detecting the radio signal with the corresponding one of the plurality of radio receivers and providing a related receiver signal during the sensing stage; and
determining the plant-related parameter based on differences between the related receiver signal and the baseline receiver signal during the sensing stage, the plant-related parameter including a leaf volume;
wherein a radio frequency of the radio signal from each of the plurality of radio transmitters is in the range of 0.5 GHZ-5.0 GHz to detect said leaf volume;
wherein at least one of the plurality of radio transmitters integrated in a first horticulture light generating device, and at least one of the plurality of radio receivers is integrated in a second horticulture light generating device.

2. The method according to claim 1, further comprising:
determining the plant-related parameter based on a channel state information analysis of each receiver signal, wherein each radio signal comprises a broad-band signal.

3. The method according to claim 1, further comprising:
monitoring the plant in the horticulture space over time during a plurality of temporally separated sensing stages, being temporally arranged within a predetermined timeframe from executing a first plant-growth-related action, the plant-growth-related action being selected from the group consisting of: controlling temperature, plant trimming, providing water, providing crop protecting treatment, providing nutrition, providing light, exposing the plants to insects, harvesting, and providing an air flow.

4. The method according to claim 1, further comprising:
executing a second plant-growth-related action in dependence of the plant-related parameter, the second plant-growth-related action being selected from the group consisting of: controlling a temperature, plant trimming, providing water, providing nutrition, providing light, exposing the plants to insects, and harvesting.

5. A horticulture system comprising:
a horticulture space,
a control system,
a plurality of radio transmitters, and
a plurality of radio receivers,
wherein each of the plurality of radio transmitters is arranged with a corresponding one of the plurality of radio receivers such that a radio path is formed between each of the plurality of radio transmitters and the corresponding one of the plurality of radio receivers and passes through at least part of the horticulture space;
wherein each of the plurality of radio transmitters is configured, in a baseline generation stage, (i) to emit a baseline radio signal from the radio transmitter that passes through a plant, (ii) to detect the baseline radio signal with the corresponding radio receiver, and iii) to provide a related baseline receiver signal;
wherein each of the radio transmitters is configured, in a sensing stage, to sequentially emit a radio signal that passes through the plant, and the corresponding radio receiver is configured to detect the radio signal and to provide a related receiver signal;
wherein the control system is configured to determine a plant-related parameter based on differences between the receiver signal and the baseline receiver signal, and wherein the plant-related parameter includes a leaf volume; and
wherein a radio frequency of the radio signal is in the range of 0.5 GHZ-5.0 GHz for detecting said leaf volume; and
wherein at least one of the plurality of radio transmitters is integrated in a first horticulture light generating device, and at least one of the plurality of radio receivers is integrated in a second horticulture light generating device.

6. The horticulture system according to claim 5, further comprising:
a plurality of horticulture light generating devices,
an actuator configured to execute a plant-growth-related action, the actuator being configured to be controlled by the control system,
wherein each horticulture light generating device comprises at least one of the plurality of radio transmitters and at least one of the plurality of radio receivers.

7. The method according to claim 1, wherein the plant-related parameter further comprises a wettening of the leaves of the plant and/or a fruit.

8. The horticulture system according to claim 5, wherein the plant-related parameter further comprises a wettening of the leaves of the plant and/or a fruit.

9. The method according to claim 1, wherein each of the sequentially emitted radio signals from the plurality of radio transmitters during the sensing stage comprise a different radio frequency.

10. The method according to claim 9, wherein a frequency of each of the sequentially emitted radio signals is selected to detect the plant-related parameter related to a fruit and related to leaves.

* * * * *